(12) United States Patent
Iwamura et al.

(10) Patent No.: US 7,225,190 B2
(45) Date of Patent: May 29, 2007

(54) REMOTE COPYING SYSTEM WITH CONSISTENCY GUARANTEED BETWEEN A PAIR

(75) Inventors: Takashige Iwamura, Yokohama (JP); Masamitsu Takahashi, Chigasaki (JP); Takao Satoh, Odawara (JP); Nobuhiro Maki, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 279 days.

(21) Appl. No.: 10/942,936

(22) Filed: Sep. 17, 2004

(65) Prior Publication Data
US 2005/0240634 A1 Oct. 27, 2005

(30) Foreign Application Priority Data

Apr. 23, 2004 (JP) .............................. 2004-127562
Jul. 28, 2004 (JP) .............................. 2004-219482

(51) Int. Cl.
G06F 17/30 (2006.01)
(52) U.S. Cl. ........................ 707/10; 707/201; 707/202; 707/204
(58) Field of Classification Search ................ 711/114, 711/161, 162; 714/6; 707/204
See application file for complete search history.

(56) References Cited

U.S. PATENT DOCUMENTS

| | | | |
|---|---|---|---|
| 5,583,995 A * | 12/1996 | Gardner et al. ............. | 709/219 |
| 5,644,766 A * | 7/1997 | Coy et al. .................... | 707/204 |
| 5,692,155 A | 11/1997 | Iskiyan et al. | |
| 5,734,818 A | 3/1998 | Kerns et al. | |
| 5,742,792 A * | 4/1998 | Yanai et al. ................. | 711/162 |
| 5,889,935 A * | 3/1999 | Ofek et al. .................... | 714/6 |
| 5,893,140 A * | 4/1999 | Vahalia et al. .............. | 711/118 |

(Continued)

FOREIGN PATENT DOCUMENTS

JP 2003-122509 4/2003

OTHER PUBLICATIONS

K. Mogi, M. Kitsuregawa, "Hot mirroring : A method of hiding parity update penalty and degradation during rebuilds for RAID5", SIGMOD '96, pp. 183-194, available online at http://portal.acm.org/citation.cfm?id=233331&dl=ACM&coll=portal&CFID=11111111&CFTOKEN=2222222.*

(Continued)

Primary Examiner—Sam Rimell
Assistant Examiner—Mark Andrew X Radtke
(74) Attorney, Agent, or Firm—Antonelli, Terry, Stout & Kraus, LLP.

(57) ABSTRACT

When plural copy groups including pairs exist, remote copying for pairs belonging to copy groups is suspended selectively on a copy group-to-copy group basis, instead of suspending remote copying in all the copy groups at once. A computer system has a host computer, plural first storage systems comprising plural first logical disks, and plural second storage systems comprising plural second logical disks. A first logical disk and a second logical disk paired with the first logical disk, and each pair belongs to either a first copy group or a second copy group. To selectively suspend remote copying on a copy group-to-copy group basis, one of the copy groups is specified first and then pairs belonging to this copy group are designated. The first storage systems comprising first logical disks of the designated pairs suspend remote copy processing for the designated pairs.

14 Claims, 15 Drawing Sheets

U.S. PATENT DOCUMENTS

| | | | |
|---|---|---|---|
| 6,044,444 A * | 3/2000 | Ofek | 711/162 |
| 6,301,643 B1 | 10/2001 | Crockett et al. | |
| 6,308,284 B1 | 10/2001 | LeCrone | |
| 6,408,370 B2 | 6/2002 | Yamamoto et al. | |
| 6,543,001 B2 * | 4/2003 | LeCrone et al. | 714/6 |
| 6,578,120 B1 * | 6/2003 | Crockett et al. | 711/162 |
| 6,647,399 B2 * | 11/2003 | Zaremba | 707/204 |
| 6,754,792 B2 | 6/2004 | Nakamura et al. | |
| 6,880,151 B2 * | 4/2005 | Abdelhadi et al. | 717/136 |
| 6,895,483 B2 * | 5/2005 | Eguchi et al. | 711/165 |
| 6,907,543 B2 | 6/2005 | Hino et al. | |
| 6,910,098 B2 | 6/2005 | LeCrone | |
| 6,934,769 B2 * | 8/2005 | Smith | 710/5 |
| 6,990,478 B2 * | 1/2006 | Loy et al. | 707/1 |
| 6,990,547 B2 * | 1/2006 | Ulrich et al. | 710/304 |
| 6,990,606 B2 * | 1/2006 | Schroiff et al. | 714/7 |
| 7,024,582 B2 * | 4/2006 | Loy et al. | 714/4 |
| 7,039,827 B2 * | 5/2006 | Meyer et al. | 714/4 |
| 2002/0026603 A1 | 2/2002 | LeCrone | |
| 2003/0051111 A1 | 3/2003 | Nakano et al. | |
| 2003/0145168 A1 | 7/2003 | LeCrone | |
| 2003/0177321 A1 | 9/2003 | Watanabe | |
| 2004/0260736 A1 | 12/2004 | Kern et al. | |
| 2004/0260899 A1 | 12/2004 | Kern et al. | |
| 2005/0033828 A1 | 2/2005 | Watanabe | |
| 2005/0055523 A1 | 3/2005 | Suishu et al. | |
| 2005/0081098 A1 | 4/2005 | Demaray | |
| 2005/0204105 A1 | 9/2005 | Kawamura | |
| 2005/0256972 A1 | 11/2005 | Cochran | |

OTHER PUBLICATIONS

D. Patterson et al., "A Case for Redundant Arrays of Inexpensive Disks (RAID)", ACM, 1988, pp. 109-116, available online at www.cs.cmu.edu/~garth/RAIDpaper/Patterson88.pdf.*

"How It Works: CHS Translation", web site, accessed Aug. 9, 2006, last modified May 6, 2002, available online at: http://ata-atapi.com/hiwchs.htm.*

Engineering White Paper "Using SYMCLI to Implement RDF Consistency Protection With SRDF Faily Product," $EMC^2$ Corporation, Published Apr. 5, 2004, 53 pgs.

Mikkelsen, C., "The Hitachi NanoCopy Advantage—An Industry First For Point-In-Time and Real-Time Copy", Hitachi White Paper, 1999, 17 pages.

IBM Redbook, "Implementing ESS Copy Services on S/390," 338 pages.

* cited by examiner

FIG. 15

COPY GROUP LIST — 1420

| COPY GROUP NUMBER | CONSISTENCY GUARANTEE LEVEL | SUB-COPY GROUP LIST POINTER | STATE |
|---|---|---|---|
| 1 | FULLY GUARANTEED | ● ADDRESS 1 | Duplex |
| 2 | FULLY GUARANTEED | ● ADDRESS 2 | Duplex |

SUB-COPY GROUP LIST — 1450a

| SUBCOPY GROUP NUMBER | COPY SOURCE CONTROL DEVICE ID | COPY TYPE | INCLUSION OF PAIR GROUPS | PAIR GROUP NUMBER/PAIR NUMBER | STATE |
|---|---|---|---|---|---|
| 1 | DEVICE AA | ASYNCHRONOUS | NO | 17021 | Duplex |
| 2 | DEVICE AB | ASYNCHRONOUS | NO | 17022 | Duplex |

SUB-COPY GROUP LIST — 1450b

| SUBCOPY GROUP NUMBER | COPY SOURCE CONTROL DEVICE ID | COPY TYPE | INCLUSION OF PAIR GROUPS | PAIR GROUP NUMBER/PAIR NUMBER | STATE |
|---|---|---|---|---|---|
| 1 | DEVICE AA | SYNCHRONOUS | NO | 17031 | Duplex |
| 2 | DEVICE AB | SYNCHRONOUS | NO | 17032 | Duplex |

PAIR-INFORMATION LIST — 1440

| PAIR NUMBER | COPY SOURCE CONTROL DEVICE ID | PRIMARY LOGICAL DISK NUMBER | COPY DESTINATION CONTROL DEVICE ID | SECONDARY LOGICAL DISK NUMBER | COPY TYPE | CONSISTENCY GUARANTEE LEVEL | PAIR GROUP NUMBER | COPY GROUP NUMBER | SUB-COPY GROUP NUMBER |
|---|---|---|---|---|---|---|---|---|---|
| 17021 | DEVICE AA | 17011 | DEVICE BA | 17013 | ASYNCHRONOUS | FULLY GUARANTEED | – | 1 | 1 |
| 17031 | DEVICE AA | 17011 | DEVICE CA | 17015 | SYNCHRONOUS | FULLY GUARANTEED | – | 2 | 1 |
| 17022 | DEVICE AB | 17012 | DEVICE BB | 17014 | ASYNCHRONOUS | FULLY GUARANTEED | – | 1 | 2 |
| 17032 | DEVICE AB | 17012 | DEVICE CB | 17016 | SYNCHRONOUS | FULLY GUARANTEED | – | 2 | 2 |

# REMOTE COPYING SYSTEM WITH CONSISTENCY GUARANTEED BETWEEN A PAIR

CLAIM OF PRIORITY

The present application claims priority from Japanese application P2004-127562 filed on Apr. 23, 2004, and P2004-219482 filed on Jul. 28, 2004, the content of both applications are hereby incorporated by reference into this application.

BACKGROUND

This invention relates to a computer system that includes a storage system, and more specifically, to a remote copying system in which data is copied between two or more storage systems.

In a computer system having a storage system, a failure in the storage system upon a disaster such as power trouble or natural calamity may stop a business that uses the computer system, and in the worst case, may cause loss of data stored in the storage system. One of techniques that can be used to avoid such a situation is remote copying with which data stored in a storage system on a primary site (the location where a computer system is set up) is transferred to a remote site (secondary site) placed at a great distance from the primary site to hold a storage system, and is copied to be stored in the storage system on the secondary site.

Remote copying is a technique of transferring write data, that is written in a storage system of the primary site from a host computer included in the computer system of the primary site, to a storage system of the secondary site to store the data in the storage system of the secondary site. There are two types of remote copying; one is synchronous remote copying and the other is asynchronous remote copying.

In synchronous remote copying, when a host sends a write command to a storage system of the primary site (primary storage system), the primary storage system first transfers write data to a storage system of the secondary site (secondary storage system) and then sends a write completion report in response to the write command to the host of the primary site.

In asynchronous remote copying, when the host sends a write command to the primary storage system, the primary storage system first sends a write completion report in response to the write command to the host, and then transfers the write data to the secondary storage system.

A logical disk set in the primary storage system is hereinafter referred to as a primary logical disk. A logical disk set in the secondary storage system to store a copy of data in the primary logical disk through remote copying is hereinafter referred to as secondary logical disk.

When a failure occurs in the computer system on the primary site, the host on the secondary site uses data stored in the secondary logical disk of the secondary storage system to resume processing by an application program. In order for the host of the secondary site to use the secondary logical disk to resume processing by an application program, it is indispensable that the secondary logical disk keeps consistency. The consistency here is a concept regarding the order of data written to a logical disk, and is considered to be achieved when the following two conditions are fulfilled:

(1) In the case where a host writes first data A and next data B to a logical disk while keeping their order intact, the host first writes the data A to a storage system and then has to wait to receive a report of completion of wiring the data A from the storage system before writing the data B to the storage system.

(2) In the case where the condition (1) is satisfied, a part or the entirety of the data B exists on the logical disk only when the entirety of the data A is on the logical disk.

In asynchronous remote copying, the primary storage system gives order information (for examlpe sequential number) to write data received from a host and transfers the write data with the sequential number attached to the secondary storage system. The secondary storage system stores data in the secondary logical disk in an order dictated by the sequential number, to thereby maintain the consistency in the secondary logical disk. Another conceivable method to maintain the consistency in the secondary logical disks in asynchronous remote copying is to group data that are written to the primary logical disk within a given period into one, and have the primary storage system atomically transfer the group of data to the secondary storage system, where the group of data is copied to the secondary logical disk. Still another way is to employ a method disclosed in U.S. Pat. No. 6,408,370 B.

Synchronous remote copying, on the other hand, finds it difficult to maintain data consistency between plural pairs of primary logical disks and secondary logical disks when the pairs are allowed to control suspend and start (or restart) copying individually.

For instance, consider a case where a pair A and a pair B are set across the primary site and the secondary site, and remote copying for the pair A is suspended because of a communication error between the primary logical disk and the secondary logical disk. Then assume that the data B is written to the primary logical disk of the pair B after the data A is written to the primary logical disk of the pair A by a host of the primary site. Since remote copying is suspended for the pair A due to the communication error, the primary storage system having the primary logical disk of the pair A sends, upon receiving the data A from the host of the primary site, a write completion report to the host of the primary site without sending the data A to the secondary storage system. Receiving the completion report, the host of the primary site then writes the data B to the primary storage system having the primary logical disk of the pair B. Since remote copying is available for the pair B, the primary storage system sends the received data B to the secondary storage system and then sends a write completion report to the host of the primary site. As a result, the secondary logical disk of the pair B stores the data B whereas the secondary logical disk of the pair A does not store the data A, disrupting the consistency between the secondary logical disks of the pair A and the pair B.

U.S. Pat. No. 5,692,155B discloses a method to solve this problem. According to this method, the consistency between secondary logical disks is ensured by the following steps:

(1) A host instructs plural pairs that pause processing of writing data from the host to the primary logical disks of each pair.

(2) Upon receiving the instruction from the host, the primary storage system executes writing of data that is received from the host prior to the instruction, while sending a busy signal in response to a write request that is received from the host after the instruction.

(3) The host further instructs every pairs to suspend remote copying. Upon receiving this instruction, the primary storage system suspends remote copy processing.

SUMMARY

The technique disclosed in U.S. Pat. No. 5,692,155B has not been developed taking into account the case in which an computer system has plural consistency groups. Therefore, in case of suspending one consistency group, the prior-art need to suspend another consistency group, and it makes the system inefficient.

A computer system includes a host computer, plural first storage systems each of which is coupled to the host computer, and plural second storage systems each connected to one of the first storage systems. The first storage systems each have a first logical disk and a first control device for controlling writing of data to the first logical disk. The second storage systems each have a second logical disk and a second control device for controlling writing of data to the second logical disk.

First, there are created a first copy group which is composed of plural pairs each of which includes a first logical disk and a second logical disk that stores a copy of data stored in the first logical disk, and a second copy group which is composed of plural pairs each of which includes a first logical disk and a second logical disk that stores a copy of data stored in the first logical disk.

Each of the plural first storage systems sends data, which is received from the host computer to be written to an associated first logical disk, to one of the second storage systems that has a second logical disk paired with the first logical disk. Each of the plural second storage systems stores the data, which is received from the corresponding first storage system, in one of the second logical disks paired with the first logical disk where the received data has been stored.

When the first copy group is designated as a copy group for which remote copy processing is to be suspended, the plural pairs that belong to the first copy group are designated, and the first storage system that has the first logical disks included in the designated pairs suspends sending data stored in the first logical disk to the corresponding second storage system.

When remote copying is suspended for one pair, only pairs that are relevant to the pair for which remote copying is suspended are interrupted in their remote copy processing whereas the rest of the pairs are allowed to continue remote copying.

In the case where there is more than one copy groups each containing pairs, remote copying between a pair belonging to each of the copy groups can be suspended independently of the rest of the copy groups.

BRIEF DESCRIPTION OF THE DRAWINGS

The present invention can be appreciated by the description which follows in conjunction with the following figures, wherein:

FIG. 15 is a diagram showing an example of a copy group list, an example of a sub-copy group list, and an example of a pair information list in the 3-site computer system according to the third embodiment.

DETAILED DESCRIPTION OF THE PREFERRED EMBODIMENTS

Hereinafter embodiments of this invention will be described with reference to the drawings. It should be noted that the embodiments below are not to limit this invention.

<First Embodiment>

(0) System Configuration

Figure 1:
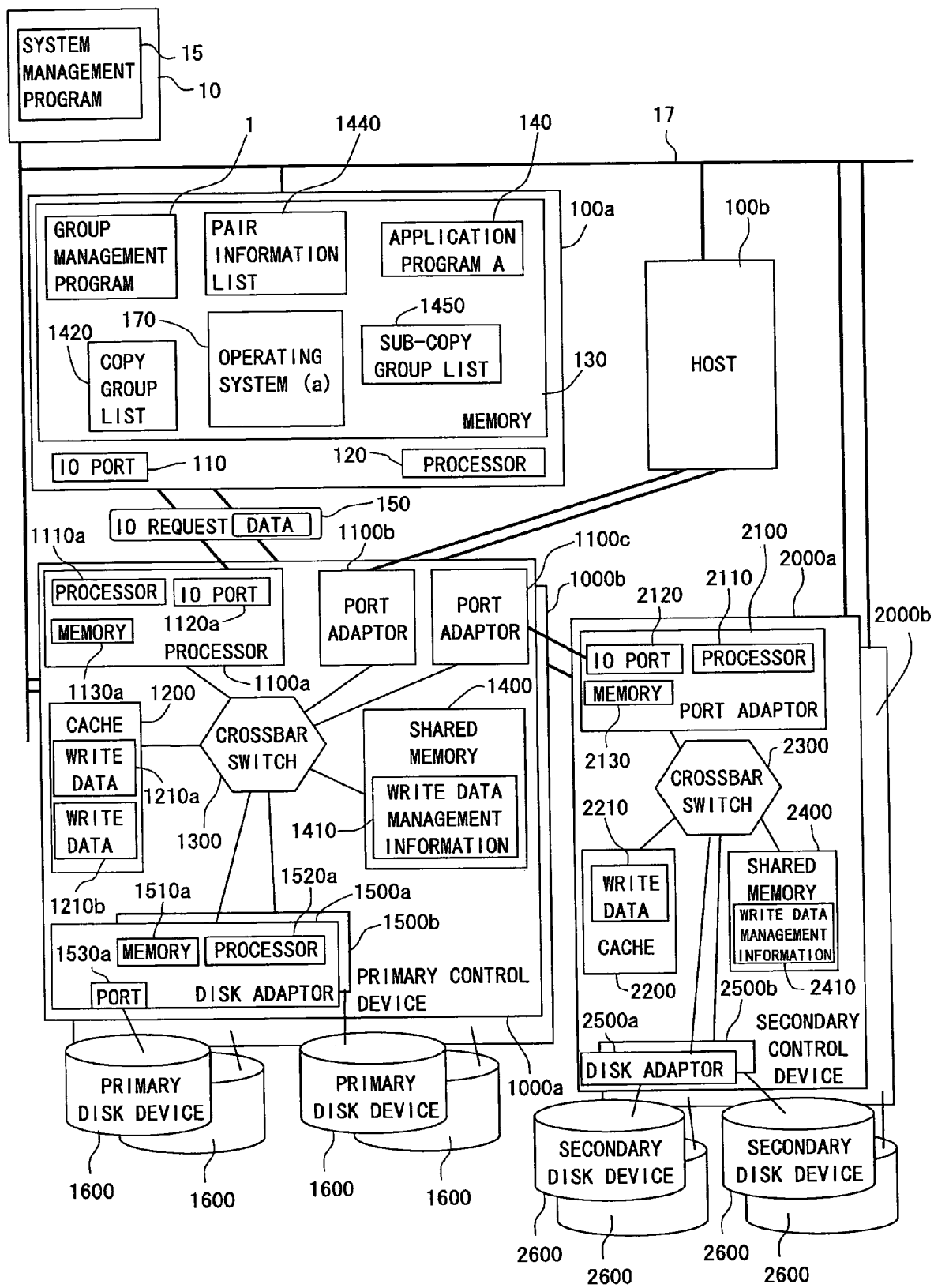
FIG. 1 is a diagram showing an example of a computer system according to a first embodiment.

An example of the configuration of a computer system according to this embodiment will be described first with reference to FIG. 1.

The computer system has a plurality of hosts 100 (100a, 100b), a plurality of primary storage systems, a plurality of secondary storage systems, and an management computer 10. The example in FIG. 1 shows two primary storage systems and two secondary storage systems, but the number of storage systems is not limited to two each. There may be more than two primary storage systems or only one primary storage system, and the same applies to the number of secondary storage systems.

Each of the plural primary storage systems has primary control devices 1000 (1000a or 1000b) and one or plural primary disk devices 1600 connected to the primary control device 1000. Similarly, each of the plural secondary storage devices has secondary control devices 2000 (2000a or 2000b) and one or plural secondary disk devices 2600 connected to the secondary control device 2000.

The management computer 10 is a computer having a CPU, a memory and an IO port to execute processing of managing the computer system. The memory stores system management program 15 executed by the CPU. The IO port couples to a management network 17.

The primary control devices 1000 are connected to the management computer 10 via the management network 17. The primary control devices 1000 are also connected to the host 100*a* and the host 100*b* via communication paths such as a fibre channel network, an IP network, and a FICON network. The primary control device 1000 is connected to the secondary control devices 2000 through a network. And remote copying of data for disaster recovery is executed through the network between the primary control device and the secondary control device.

The primary control devices 1000 have port adaptors 1100 (1100*a*, 1100*b* and 1100*c*), disk adaptors 1500 (1500*a* and 1500*b*) and a crossbar switch 1300. The port adaptors 1100 are connected to a shared memory 1400, a cash memory 1200, the hosts 100, or the secondary control devices 2000. The disk adaptors 1500 are connected to the primary disk device 1600. The crossbar switch 1300 connects the port adaptors 1100 and the disk adaptors 1500 to each other.

The disk adaptors 1500 have ports 1530 through which the disk adaptors 1500 are connected to the primary disk devices 1600. The disk adaptors 1500 manage data in the disk devices 1600 and, if necessary, transfer the data to other devices. To this end, the disk adaptors 1500 have processors 1520 and memories 1510. The memories 1510 store a program executed by the processors 1520.

The port adaptors 1100 have processors 1110, IO ports 1120 and memories 1130. The port adaptors 1100 receive an IO request from the host 100 and implement remote copying to the secondary control devices 2000 as the need arises.

The secondary control devices 2000 have a configuration similar to that of the primary control devices 1000, and include port adaptors 2100, cache memories 2200, a crossbar switch 2300, a shared memory 2400 and disk adaptors 2500 (2500*a* and 2500*b*).

The primary disk device 1600 and the secondary disk device 2600 are FC (Fibre Channel) disks, SATA (Serial ATA) disks, or the like. The one or plural primary disk devices 1600 and the one or plural secondary disk devices 2600 serve as logical disks. Specifically, a logical disk is defined as the entirety of, or some storage areas of, one disk device. In some cases, a logical disk is defined as an aggregation of some or whole storage areas taken from plural disk devices.

The hosts 100 have an IO port 110, a processor 120 and a memory 130. The IO port 110, the processor 120 and the memory 130 are connected to one another through communication paths such as internal buses, though not shown in the drawing. Different operating systems may be run on different hosts. Different hosts may employ different IO communication methods to communicate with control devices. The hosts 100 are connected to the management computer 10 via the management network 17.

(1) Copy Processing Operation in Control Device (1.1) Copy Processing Operation for Synchronous Remote Copying Synchronous remote copying is, as mentioned above, a remote copy method in which a primary control device receiving a write request to a primary logical disk from the host sends write data to a secondary control device and then sends a write completion report to the host.

Figure 2:
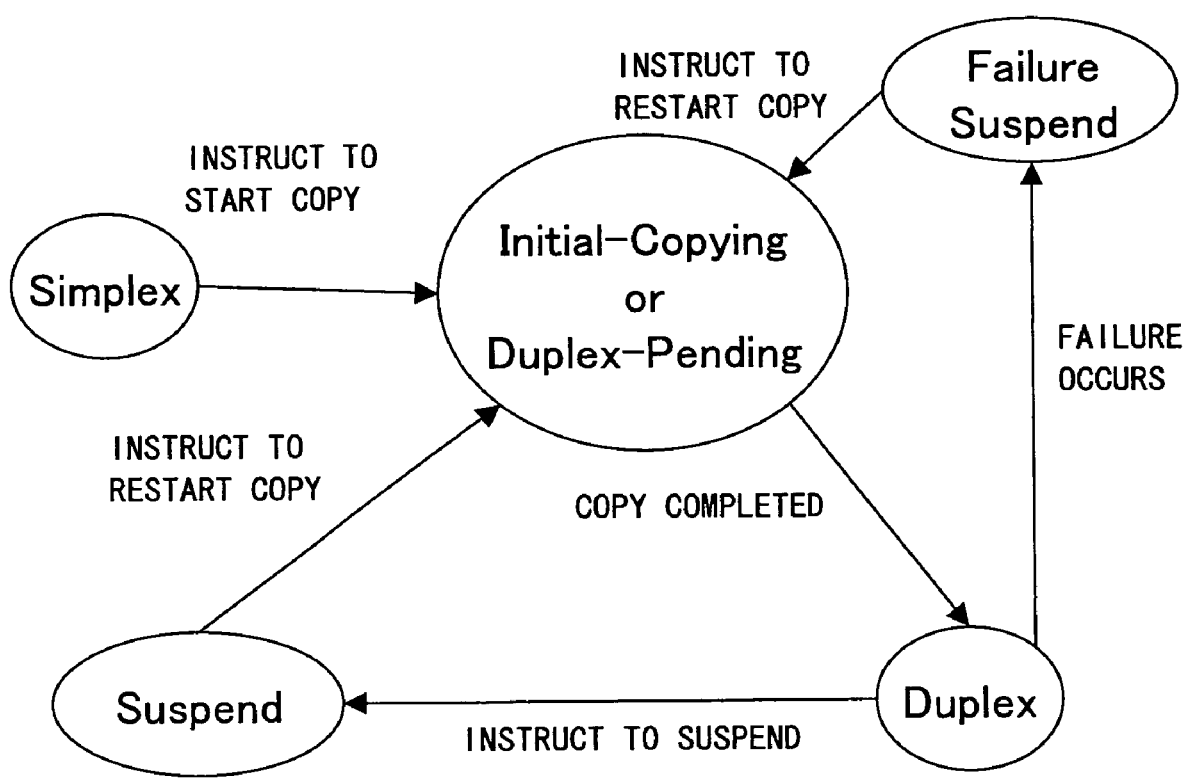
FIG. 2 is a diagram showing an example of transition of pair state in synchronous remote copy in the first embodiment.

In synchronous remote copying, the management computer 10 displays the status of remote copying between pairs of primary logical disk and secondary logical disk. In order to enable the management computer 10 to operate the remote copy status, the control devices of the storage systems manage information called a pair state (Simplex, Initial-Copying, Duplex, Suspend, and Duplex-Pending states). FIG. 2 is a pair state transition diagram in synchronous remote copying. Given below is a description on each pair state.

(1.1.1) Simplex State

The Simplex state indicates that copying is not started yet between a primary logical disk and a secondary logical disk, that constitute a pair.

(1.1.2) Duplex State

The Duplex state indicates that initial copying, which will be described later, has been completed following the start of synchronous remote copying, and that a primary logical disk and a secondary logical disk which are paired with each other now have the same data contents. In synchronous remote copying, write complete message to the host is respond after data of write request to the primary logical disk being copied to the secondary logical disk. Therefore, the primary logical disk and the secondary logical disk share the same contents except for an area where writing is in progress.

(1.1.3) Initial-Copying State

The Initial-Copying state is an intermediate state between the Simplex state and the Duplex state. Initial copying (to copy data that has been stored in the primary logical disk to the secondary logical disk) occurs in this intermediate state as needed. As initial copying is completed and processing necessary for transition to the Duplex state is finished, the pair state moves to the Duplex state.

(1.1.4) Suspend State

The Suspend state indicates that data written to a primary logical disk is not reflected to a secondary logical disk. In the Suspend state, a primary logical disk and a secondary logical disk which are paired with each other have different data. The pair state shifts to the Suspend state from other states upon instruction from an operator or a host. The pair state may automatically shift to the Suspend state when synchronous remote copying is interrupted by a failure in a communication line between a primary storage system and a secondary storage system or by other similar causes.

The latter case, namely, the Suspend state resulting from a failure, will hereinafter be called a failure Suspend state. Typical causes of the failure Suspend state are a failure of a primary logical disk or a secondary logical disk, a failure of a primary control device or a secondary control device, and a communication failure between a primary control device and a secondary control device.

When a write request to the primary logical disk is issued after the primary logical disk and the paired secondary logical disk have gone into the Suspend state, the primary control device receives write data and storing the data in the cache memory. Then the primary control device writes the data in the primary logical disk, but does not send the write data to the secondary logical disk. The primary control device records the write position in the primary logical disk of the written data as a differential bit map or the like. After receiving the write data and storing the data in the cache memory, the primary control device sends a completion report to the host without sending the write data to the secondary control device.

In the case where a write request to the secondary logical disk is made after the pair has gone into the Suspend state, the secondary control device operates as the primary control device does in the above description.

(1.1.5) Duplex-Pending State

The Duplex-Pending state is an intermediate state between the Suspend state and the Duplex state. In the Duplex-Pending state, data of a primary logical disk is copied to its paired secondary logical disk in order to make the data contents of the primary logical disk and the data contents of the secondary logical disk coincide with each other. After data in the secondary logical disk is made identical with data in the primary logical disk, the pair state shifts to the Duplex state.

Data copying in the Duplex-Pending state is differential copying utilizing the write position (for example, the differential bit map mentioned above) recorded by a primary control device or a secondary control device in the Suspend state. In differential copying, only a part that needs to be updated (for example, the part of data in the primary logical disk that does not match data in the secondary logical disk) is copied.

The description given above treats the Initial-Copying state and the Duplex-Pending state as two different states. Alternatively, the Initial-Copying state and the Duplex-Pending state may be treated as one state to be displayed on a screen of the management computer 10 as one of four remote copy pair transition states.

(1.2) Operation for Asynchronous Remote Copying

In asynchronous remote copying, a primary control device receiving write data from a host sends, asynchronously, independent of transmission of a write completion report to the host, the write data to a secondary control device to be written in a secondary logical disk.

Given below are methods of copying data from a primary control device to a secondary control device in asynchronous remote copying.

One of the methods, for example, is to create a log entry, which is a combination of control information containing the address of a storage area in a primary logical disk where data is to be written and the data to be written, each time the primary control device receives write data from a host. This log entry is transferred to a secondary control device, which writes the received data to a storage area of a secondary logical disk following the control information in the log entry.

An evolutionary form of this method is to include time order information indicating the order of writing data in control information of a log entry. A secondary control device writes data to a storage area of a secondary logical disk in an order that reflects the time order information.

An even more efficient method, for write request to the same storage area of the primary logical disk received continuously, is to transfer only a log entry for the last write request, not transfer a log entry for the previous write request (for example, log entries for writing that is to be written over by subsequent writing).

Another example of asynchronous remote copying is to have a primary control device keep, as differential data, data that is written in a primary logical disk within a given period of time. The differential data is sent to a secondary control device to be copied to a secondary logical disk. In this method, copying to a logical disk occurs after every differential data is transferred to the secondary control device.

Figure 3:
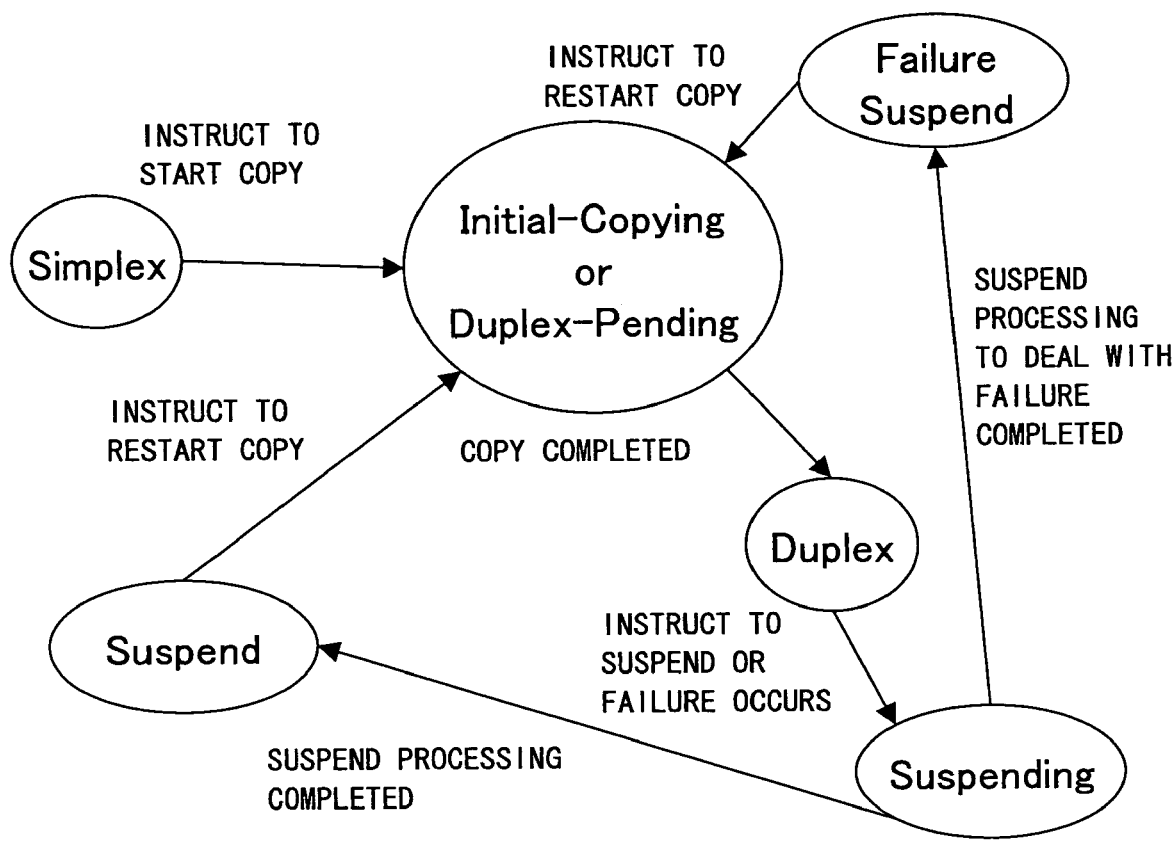
FIG. 3 is a diagram showing an example of transition in asynchronous remote copy pair state in the first embodiment.

Asynchronous remote copying also uses pair state information (Simplex, Initial-Copying, Duplex, Suspend, Duplex-Pending, and Suspending states) for operation and management. FIG. 3 is a pair state transition diagram in asynchronous remote copying. The Simplex, Initial-Copying, Suspend, and Duplex-Pending states are same to those in synchronous remote copying.

(1.2.1) Duplex State

The Duplex state in asynchronous remote copying is basically the same as in synchronous remote copying. The difference is that there is a short delay before a secondary logical disk catches up with a primary logical disk since write data is copied to the secondary logical disk asynchronously.

(1.2.2) Suspending State

The Suspending state is an intermediate state between the Duplex state and the Suspend state. In asynchronous remote copying, the pair state shifts to the Suspend state through the Suspending state. As in the Suspend state in synchronous remote copying, a primary control device and a secondary control device record the position where write data received from a host after the pair state has reached the Suspending state is written. Also recorded in asynchronous remote copying by the primary control device is the data write position contained in a log entry (or the log entry itself concerning write data that has been received by the primary control device from the host before the Suspending state is reached and that has not been copied from the primary control device to the secondary control device before the Suspending state is reached.

(2) Procedure of Creating Copy Group in Control Device

A procedure of creating copy groups and sub-copy groups is now described.

(2.1) Concept of Copy Group and Sub-Copy Group

The concept of copy group and sub-copy group is explained first.

The hosts 100 manage pairs utilizing a "copy group" and a "sub-copy group" for integrated operation of the pairs.

A "copy group" is a group of pairs to be processed together, and represents an aggregation of sub-copy groups. A "sub-copy group" is an aggregation of pairs for which the primary control device or the secondary control device provides a method for group operation.

A copy group or a sub-copy group is designated when group management program 1 executed in the hosts 100 designats an aggregation of pairs to be operated together, based on an instruction from the system management program 15 executed in the management computer 10 or an application program 140 executed in the hosts 100. For example, when there is more than one application program that is being executed in the hosts 100, one copy group is allotted to each of the application programs. Every pair, constituted of a logical disk in which data is read or written by an application program, can be included in a copy group that is assigned to this application program. This makes it possible to suspend remote copying at once for every pair assigned to an application program (suspend remote copying on an application-to-application basis).

The hosts 100 manage copy groups and sub-copy groups using three lists: a copy group list 1420, a sub-copy group list 1450, and a pair information list 1440. These lists are placed in the memory 130 of the hosts 100.

Figure 4:
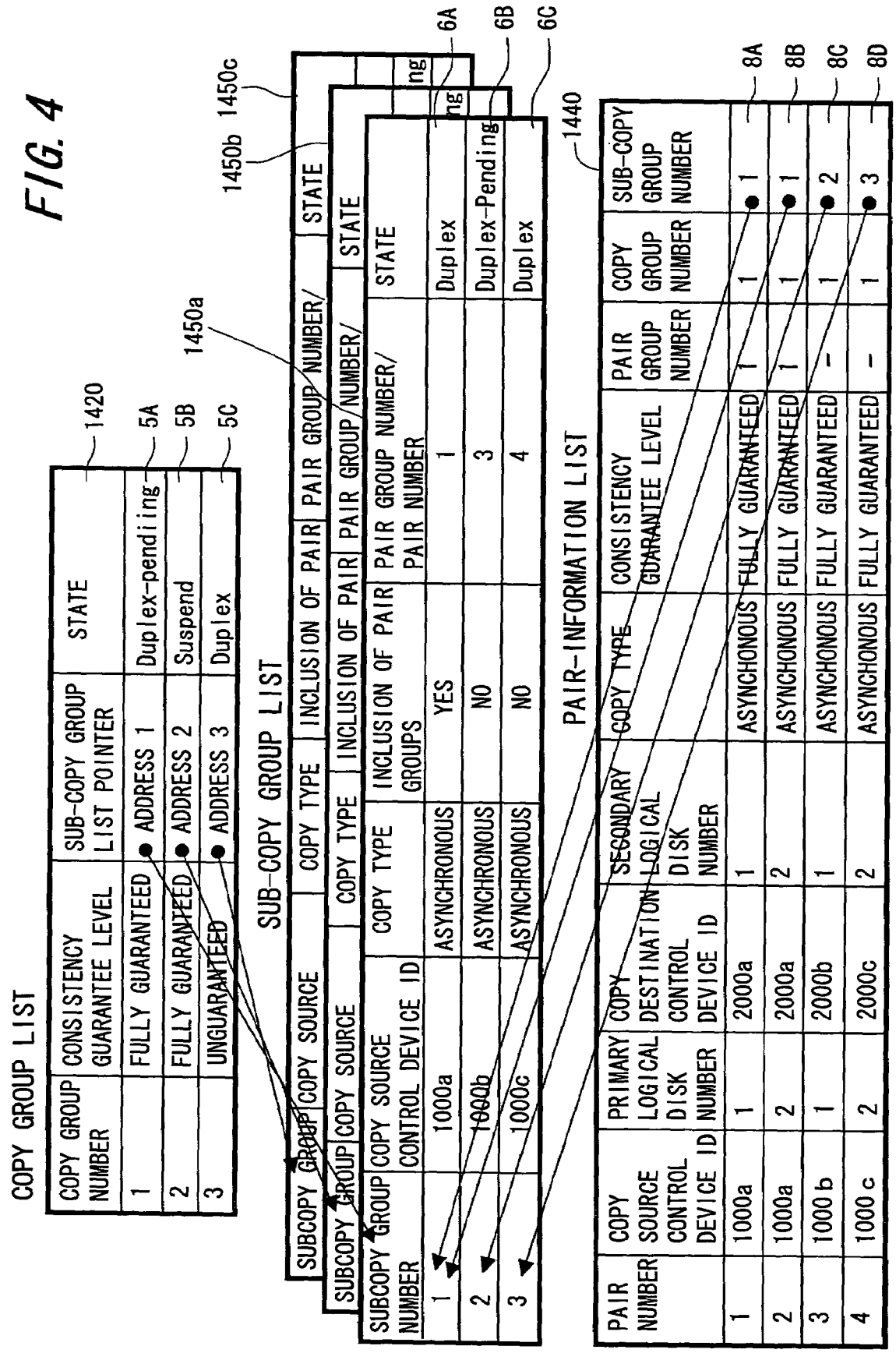
FIG. 4 is a diagram showing an example of a copy group list, an example of a sub-copy group list, and an example of a pair information list as well as the relation between these lists in the first embodiment.
Figure 5:
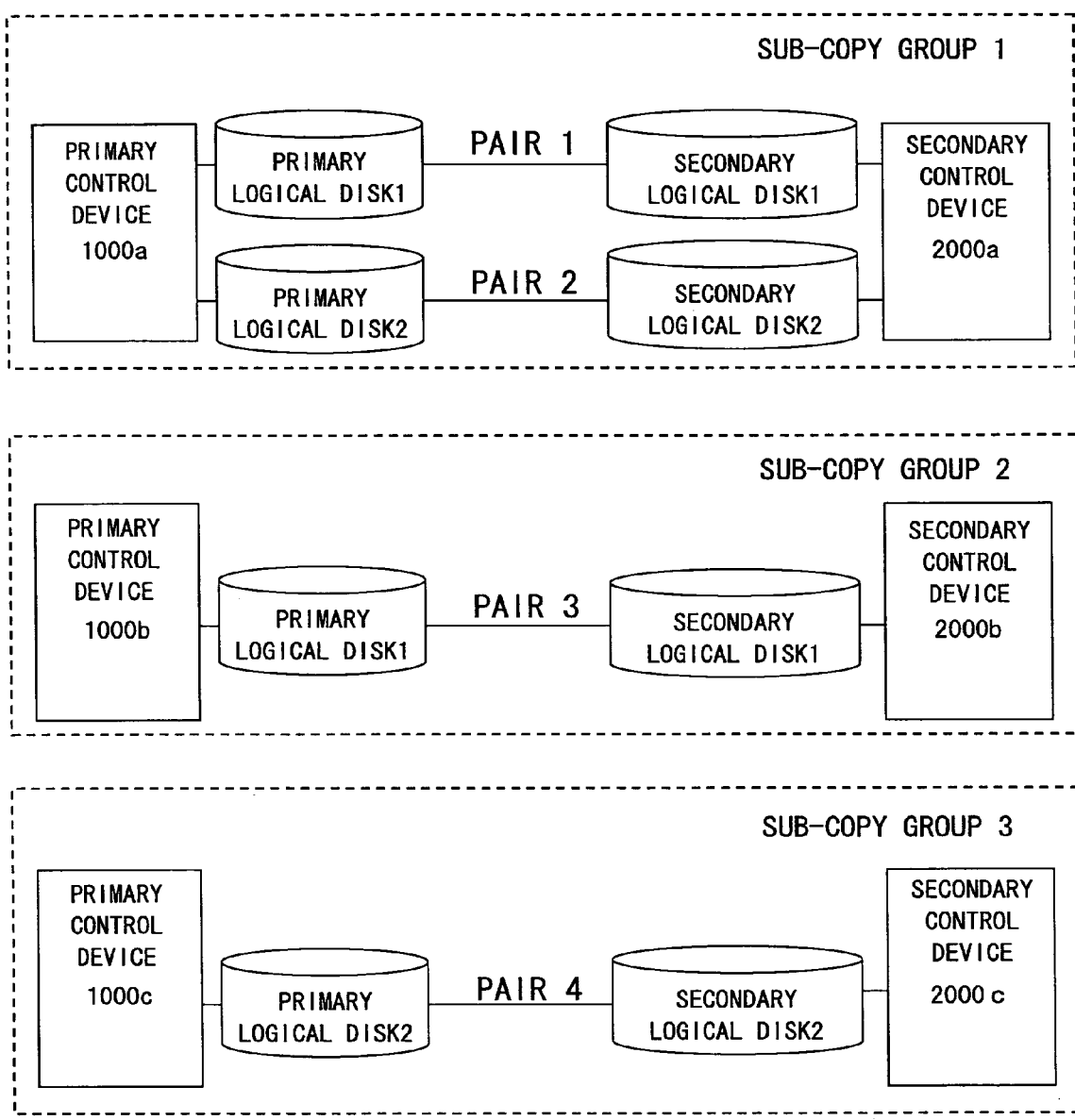
FIG. 5 is a diagram showing an example of the configuration of a copy group in the first embodiment.

A description on copy groups and sub-copy groups will be given below with reference to FIG. 4 and FIG. 5. FIG. 4 is a diagram showing an example of the copy group list, an example of the sub-copy group list, and an example of the pair information list 1440 as well as the relation between these lists. FIG. 5 is an explanatory diagram showing an example of the configuration of a copy group.

The copy groups list 1420 shown in FIG. 4 is a list of copy groups defined by the hosts 100. The copy group list stores of "Copy group number", "Consistency guarantee level", "Sub-copy group list pointer", and "State".

"Copy group number" is an identifier unique to this copy group.

"Consistency guarantee level" refers to information about the consistency of secondary logical disks constituting pairs that are contained in the copy group. There are three consistency guarantee levels: "fully guaranteed", "sub-copy group", and "unguaranteed". When the consistency guarantee level is "fully guaranteed", the consistency is guaranteed among all secondary logical disks constituting pairs that belong to a copy group. When the consistency guarantee level is "sub-copy group", the consistency is guaranteed among secondary logical disks constituting pairs that belong to the same sub-copy group but not between a logical disk in one sub-copy group and a logical disk in another sub-copy group. The consistency guarantee level "unguaranteed" applies to cases other than the former two cases, and means that the consistency is guaranteed for each of the secondary logical disks which constitutes a pair, for instance.

"Sub-copy group list pointer" is the address in the memory 130 of a sub-copy group list in which sub-copy groups belonging to the copy group are registered.

"State" indicates the current state of the copy group which is picked up from the states shown in FIG. 2 or 3.

The sub-copy group list 1450 is a list of sub-copy groups that constitute a copy group. Accordingly, one sub-copy group list is prepared for each copy group. In the example of FIG. 4, the copy group list has three copy groups and therefore three sub-copy group lists are provided.

A sub-copy group may be equal to a consistency group in asynchronous remote copying. The consistency group is an aggregation of pairs in which the consistency of write data update order and the consistency upon shutdown due to a failure are guaranteed among plural logical disks. Alternatively, a sub-copy group may be equal to a operation group in synchronous remote copying. The operation group is a group of pairs which are operated together by a control device of a storage system.

Each sub-copy group list stores "Sub-copy group number", "Copy source control device ID", "Copy type", "Inclusion of pair groups", "Pair group number/pair number", and "State".

"Sub-copy group number" is an identifier unique to this sub-copy group in a copy group.

"Copy source control device ID" is an identifier unique to a copy source control device of a pair included in the sub-copy group.

"Copy type" indicates the type of remote copying, for instance, asynchronous remote copying or synchronous remote copying.

"Inclusion of pair groups" indicates whether the sub-copy group contains plural pairs or not. When this field holds "Yes", the sub-copy group includes plural pairs. "No" indicates that the sub-copy group consists of one pair.

"Pair group number/pair number" indicates the identification number of a pair group or pair belonging to the sub-copy group. When the "inclusion of pair groups" field holds "Yes", the "pair group number/pair number" field has the identification number of the pair groups. When the "inclusion of pair groups" field holds "No", the "pair group number/pair number" field has the identification number of the pair. A pair group number is an identifier which is provided for group management within a storage system and is unique throughout the storage system. Typically, the identifier of a consistency group or the identifier of a manegement group is allotted as the pair group number. A pair number is an identifier unique to each pair and is used in retrieval of pair information from the pair information list 1440.

"State" indicates the current state of the sub-copy group. When the copy type is synchronous remote copying, the "state" field holds one of the states shown in FIG. 2. When the copy type is asynchronous remote copying, the "state" field holds one of the states shown in FIG. 3.

The pair information list 1440 is a list for storing information related to pairs, such as control devices constituting a pair for remote copying and logical disks paired for remote copying, and identifiers for group operation by control devices. The primary control devices 1000 refer the pair information list 1440 in order to find out to which secondary logical disk of which secondary control device data stored in a primary logical disk is to be copied.

Pair information list stores "Pair number", "Copy source control device ID", "Primary logical disk number", "Copy destination control device ID", "Secondary logical disk number", "Copy type", "Consistency guarantee level", "Pair group number", "Copy group number", and "Sub-copy group number".

"Pair number" is an identifier unique to the pair.

"Copy source control device ID" is an identifier of a control device to be a copy source. "Primary logical disk number" is an identifier of a logical disk to be a copy source. "Copy destination control device ID" is an identifier of a control device to be a copy destination. "Secondary logical disk number" is an identifier of a logical disk to be a copy destination.

"Copy type" and "consistency guarantee level" are information identical to those recorded in the copy-group list 1420 and sub-copy group list 1450 described above. Therefore, it is not always necessary to record the copy type and consistency guarantee level as pair information but the access speed is increased by having the pair information list 1440 hold the two for data redundancy.

"Pair group number" is an identifier for executing group management within a storage system, and corresponds to the identifier of a consistency group or operation group which the pair belongs to. The pair group number is identical with the pair group number recorded in the sub-copy group list 1450 described above.

"Copy group number" is an identifier of a copy group which the pair belongs to. "Sub-copy group number" is an identifier of a sub-copy group which the pair belongs to.

The shared memories (1400 and 2400) of the primary control devices 1000 and the secondary control devices 2000 store the whole pair information list and a remote copy program. Instead of the whole pair information list, the shared memories may store portions of the pair information list that are needed for each of the primary control devices or secondary control devices to manage pairs. The remote copy program stored in the shared memories is executed by the port adaptors 1110, so that pairs are managed with the use of the pair information list.

The relation between the three lists is as shown in FIG. 4.

In the example of FIG. 4, there are three copy groups in the plural primary storage systems on the primary site. The three copy groups are registered in the copy group list 1420. Entries 5A, 5B and 5C in the copy group list each contain a sub-copy group list pointer. The sub-copy group list pointer points to the location where a sub-copy group list (1450*a*, 1450*b*, 1450*c*), which indicates sub-copy groups belonging to a copy group, is stored (the address in the memory 130). There are as many sub-copy group lists as the number of copy groups registered. The example of FIG. 4 has three sub-copy group lists.

The "inclusion of pair groups" field in an entry 6A of the sub-copy group list holds "Yes", indicating that the sub-copy group contains a plurality of pairs. Information of the pairs included in the sub-copy group can be obtained from the pair information list 1440 by searching with the copy group number and the sub-copy group number. A pair index may be created in order that pairs included in a sub-copy group or in a copy group can be found more quickly.

FIG. 5 shows the configuration of a copy group with copy group number 1, which is one of the copy groups in FIG. 4. The copy group with copy group number 1 has three sub-copy groups. A sub-copy group with sub-copy group number 1 has the primary control device 1000a as the copy source control device. A sub-copy group with sub-copy group number 2 has the primary control device 1000b as the copy source control device. A sub-copy group with sub-copy group number 3 has the primary control device 1000c as the copy source control device.

The sub-copy group with sub-copy group number 1 includes a plurality of pairs. Specifically, the sub-copy group with sub-copy group number 1 includes two pairs: a pair 1 consisting of a primary logical disk 1, which is connected to the primary control device 1000a, and a secondary logical disk 1, which is connected to the secondary control device 2000a, and a pair 2 consisting of a primary logical disk 2, which is connected to the primary control device 1000a, and a secondary logical disk 2, which is connected to the secondary control device 2000a.

The sub-copy group with sub-copy group number 2 includes a pair 3 consisting of a primary logical disk 1, which is connected to the primary control device 1000b, and a secondary logical disk 1, which is connected to the secondary control device 2000b.

The sub-copy group with sub-copy group number 3 includes a pair 4 consisting of a primary logical disk 2, which is connected to the primary control device 1000c, and a secondary logical disk 2, which is connected to the secondary control device 2000c.

(2.2) Procedure of Creating Copy Group and Sub-Copy Group

A procedure of creating copy groups, sub-copy groups, and pairs will be described referring to FIG. 6 and FIG. 7.

Figure 6:
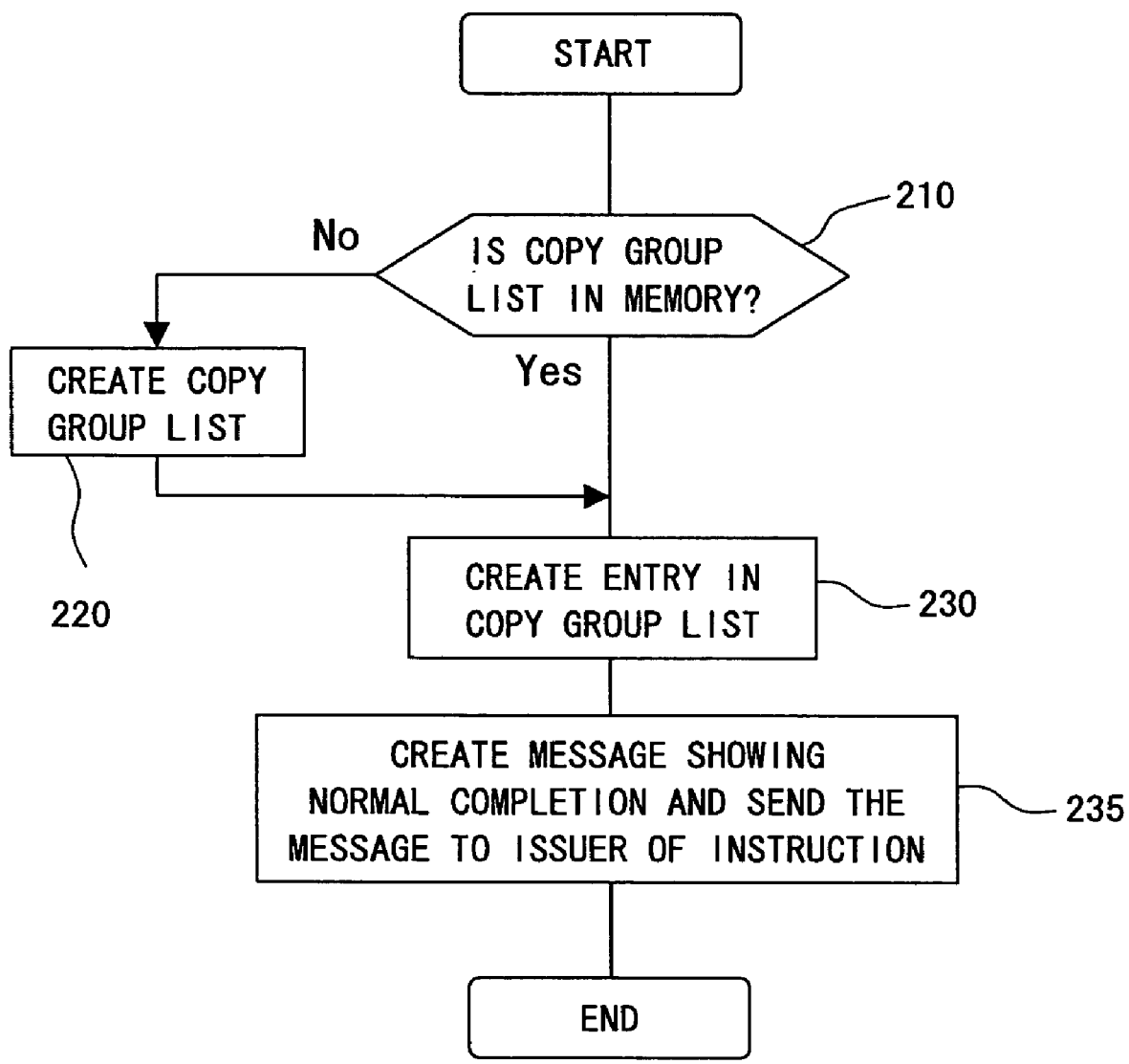
FIG. 6 is a diagram showing an example of a procedure of creating a copy group in the first embodiment.

FIG. 6 is a flow chart showing an example of a procedure of creating a copy group.

Figure 7:
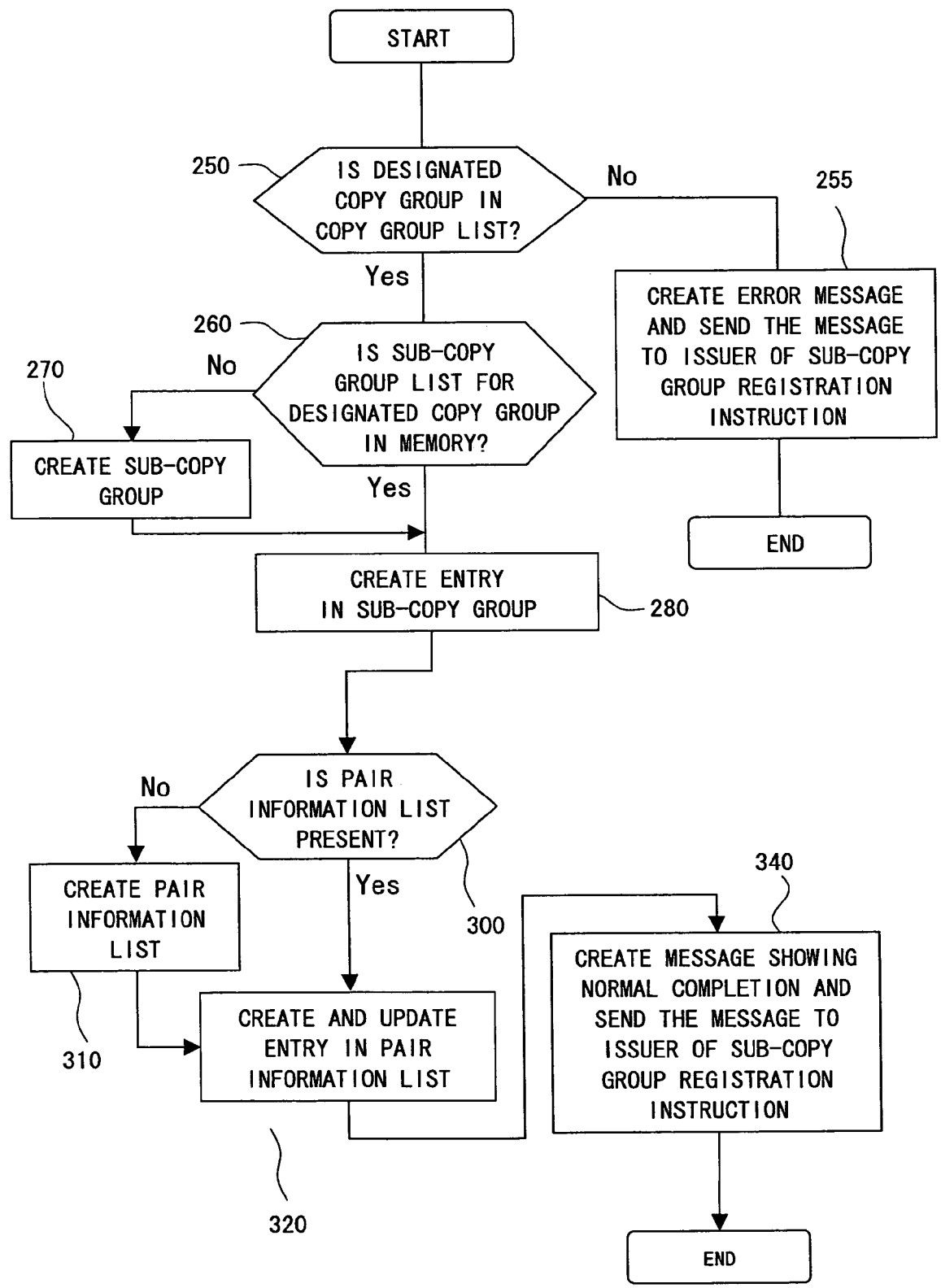
FIG. 7 is a diagram showing an example of a procedure of creating a sub-copy group in the first embodiment.

FIG. 7 is a flow chart showing an example of a procedure of creating a sub-copy group.

First, copy groups are created by processing shown in FIG. 6.

An instruction of creating a copy group is issued by the system management program 15 executed in the management computer 10 or by an application program A 140 executed in the hosts 100, and is received by the group management program 1 executed in the hosts 100.

The group management program 1 checks whether or not the copy group list 1420 is in the memory 130 (Step 210) and, when it is found as a result that the memory does not have the copy group list, creates the copy group list (Step 220).

Next, the group management program 1 adds a new entry to the copy group list (Step 230). The newly added entry contains a copy group number and consistency guarantee level received from the system management program 15 or from the application program A 140 by the group management program 1. The state field in this entry is set to "Simplex".

Alternatively, the group management program 1 may choose a copy group number that does not match any copy group number of existing copy groups and record the chosen number in the newly added entry.

A sub-copy group list pointer is registered after a sub-copy group list is created.

After the new entry is added, the group management program 1 creates a message saying that creation of a copy group based on the copy group creation instruction is completed. The message is included in a response to the system management program 15 or the application program A 140 which has issued the copy group creation instruction (Step 235). The response may also contain the copy group number of the newly created copy group.

Next, sub-copy groups are created next by processing shown in FIG. 7.

An instruction of registering a sub-copy group is issued by the system management program 15 or the application program A 140, and is received by the group management program 1. The sub-copy group registration instruction contains a copy group number.

The group management program 1 judges whether the copy group number contained in the sub-copy group registration instruction is in an entry of the copy-group list 1420 (Step 250). When it is found as a result that the copy group list does not have this copy group number, the group management program 1 creates an error message saying that the copy group specified in the sub-copy group registration instruction does not exist, and sends a response containing the error message to the issuer of the sub-copy group registration instruction (Step 255).

When the copy group list has the copy group number contained in the sub-copy group registration instruction, it is judged whether a sub-copy group list for this copy group is in the memory 130 (Step 260). Specifically, this is judged by whether there is a pointer registered in the sub-copy group list pointer field of an entry in the copy group list that corresponds to the copy group number contained in the sub-copy group registration instruction.

When it is found as a result that the sub-copy group list is not in the memory 130 (in other words, when the sub-copy group list pointer filed does not have a pointer registered), the group management program 1 creates a sub-copy group list. The group management program 1 then registers a pointer to the newly created sub-copy group list (namely, the address where this sub-copy group list is to be stored in the memory 130) to the sub-copy group list pointer field in the copy group list (Step 270).

On the other hand, when it is judged in Step 260 that the sub-copy group list is in the memory 130 (namely, a pointer is registered in the sub-copy group list pointer field), the group management program 1 adds an entry to the sub-copy group following the contents of the sub-copy group registration instruction received (Step 280). Similarly, the group management program 1 adds an entry to the new sub-copy group list after the new sub-copy group list is created in Step 270 (Step 280).

The added entry in the sub-copy group has "sub-copy group number", "copy source control device ID", "copy type", "inclusion of pair groups", "pair group number/pair number", and "state". These information are specified in the sub-copy group registration instruction.

The "state" field has "Simplex" as the initial state. For "sub-copy group number", the group management program 1 may choose a sub-copy group number that does not match any sub-copy group number of the other sub-copy groups in the same copy group.

Registration of a pair to the sub-copy group comes next. The group management program 1 first judges whether a pair information list 1440 is in the memory 130 (Step 300). When the memory 130 does not have a pair information list 1440, the group management program 1 creates one (Step 310).

When it is judged in Step 300 that the memory 130 has a pair information list 1440, the group management program 1 creates an entry in the pair information list 1440 following the sub-copy group registration instruction (Step 320). Similarly, the group management program 1 follows the sub-copy group registration instruction to create an entry in the pair information list 1440 that has been created in Step 310 (Step 320).

The added entry in the pair information has a "pair number", "copy source control device ID", "primary logical disk number", "copy destination control device ID", "secondary logical disk number", "consistency guarantee level", "pair group number", "copy group number", and "sub-copy group number". These information are specified in the sub-copy group registration instruction. As has been mentioned in the description of Step 280, "sub-copy group number" may be a number chosen by the group management program 1.

In addition to creating a new pair and registering information of the pair in a pair information list 1440 as described above, the group management program 1 may register an existing pair in a newly created sub-copy group. In this case, "pair number", "copy source control device ID", "primary logical disk identification number", "copy destination control device ID", and "secondary logical disk identification number" are already registered as information of the existing pair in a pair information list 1440, and the group management program 1 updates the entry of the existing pair in the pair information list 1440 in Step 302. Specifically, the group management program 1 registers values specified in the sub-copy group registration instruction in the "consistency guarantee level", "pair group number", "copy group number", and "sub-copy group number" fields.

After an addition of a new entry to a pair information list or an update of a pair information list in Step 320, the hosts 100 distribute the pair information list to the primary control devices 1000 and the secondary control devices 2000. The pair information list distributed to the primary control devices 1000 and the secondary control devices 2000 does not always need to be identical with the pair information list the hosts 100 own. And primary control devices 1000 and secondary control devices 2000 may have only information about the pair related to each the primary control device 1000 or secondary control device 2000. The pair information list may be distributed during initial copy start processing, which will be described later referring to FIG. 8 (specifically, in Step 12004 of FIG. 8). The pair information list is sent, preferably, but not exclusively, as an accompaniment to a pair creation instruction directed to control devices which will be described later.

The group management program 1 lastly creates a message for notifying completion of the sub-copy group registration based on the sub-copy group registration instruction. The message is sent by the group management program 1 to the issuer of the sub-copy group registration instruction (Step 340).

Copy groups and sub-copy groups are created through the above processing. Once creation of copy groups and sub-copy groups is completed, the group management program 1 can start or suspend copy processing on a copy group-to-copy group basis by specifying a copy group.

(3) Cooperation with Remote Copying-Group Management Program 1

(3.1) Start of Initial Copying

Figure 8:
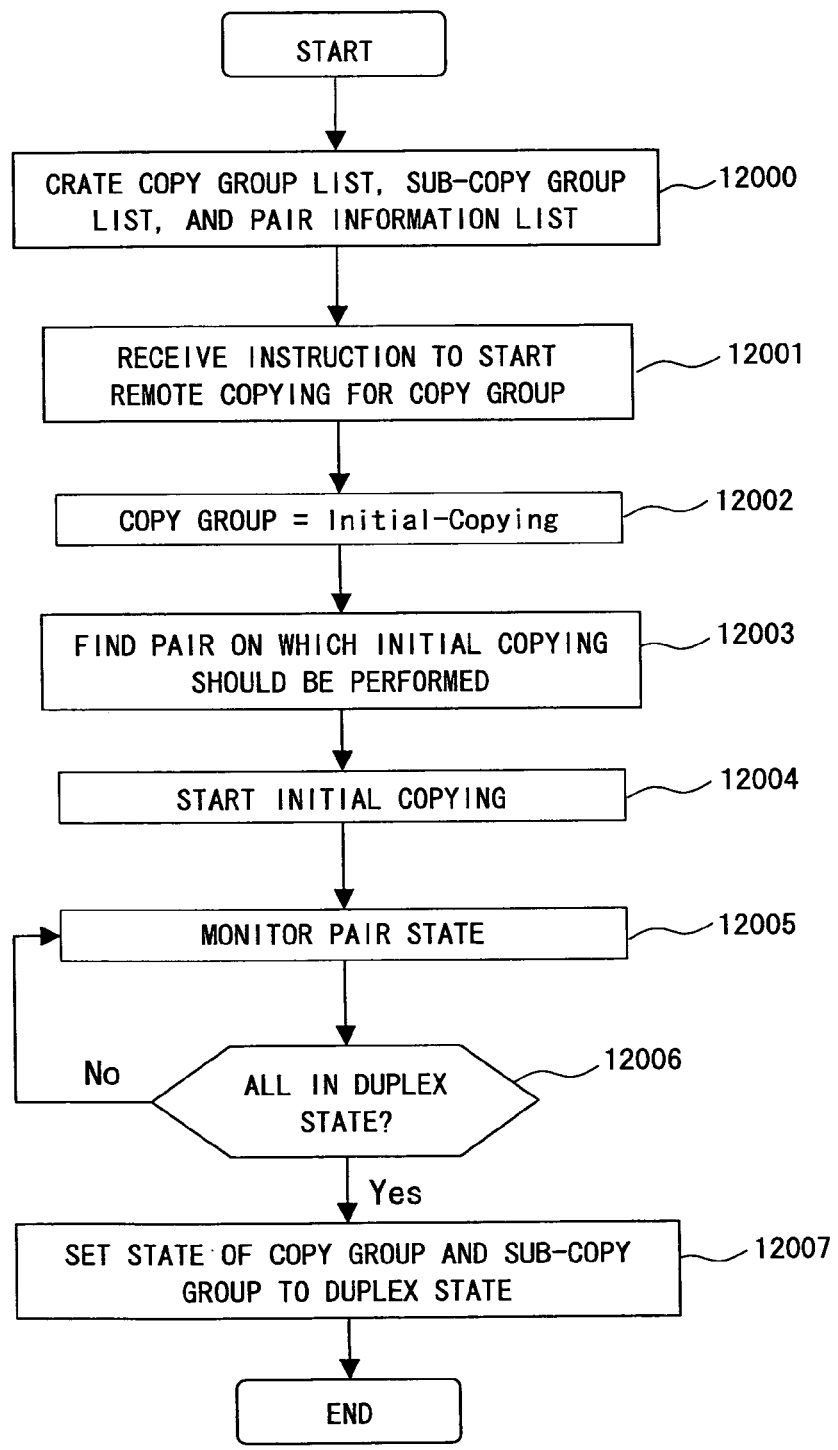
FIG. 8 is a diagram showing an example of processing for executing initial copying of remote copying on a copy group-to-copy group basis in the first embodiment.

FIG. 8 shows an example of processing for executing initial copying of remote copying on a copy group-to-copy group basis.

First, the group management program 1 creates the copy group list 1420, the sub-copy group list 1450, and the pair information list 1440 through the processing shown in FIG. 6 and FIG. 7 (Step 12000).

The group management program 1 receives an instruction to start remote copying from the system management program 15 or from the application program A 140. The remote copy start instruction contains a copy group number (Step 12001).

The group management program 1 searches a copy group list for a copy group number specified in the remote copy start instruction, and then sets the state of the corresponding copy group as well as the state of every sub-copy group that belongs to this copy group to Initial Copying (Step 12002).

The group management program 1 refers to the copy group list 1420, the sub-copy group list 1450, and the pair information list 1440 in order to find one or more pairs for which primary control devices are instructed to perform initial copying (Step 12003). In other words, one or more pairs belonging to a copy group that is specified in the remote copy start instruction are found in this step.

The group management program 1 gives a copy initialization instruction for executing initial copying of the pair found in Step 12003 to a primary control device of each pair. Receiving the copy initialization instruction, the primary control device starts initial copying for the pair specified in the copy initialization instruction (Step 12004). In other words, data stored in the primary logical disk of the pair that is specified in the copy initialization instruction is copied to its paired secondary logical disk.

The group management program 1 needs the following information, which is obtained by consulting the pair information list, in order to give a copy initialization instruction:

(A) Copy type (B) Primary control device (copy source control device) ID (C) Primary logical disk number (D) Secondary control device (copy destination control device) ID (E) Secondary logical disk number (F) Sub-copy group number It is also possible for the group management program 1 to instruct a primary control device to perform copy initialization by specifying a pair number instead of the above information (A) through (F). It is also possible for the group management program 1 to instruct a primary control device to perform copy initialization by specifying a combination of a copy group number and a sub-copy group number or by specifying a pair group number instead of a pair number. In this case, the primary control device designates a primary logical disk, secondary control device and a secondary logical disk from its own pair information list based on the received pair number, combination of a copy group number and a sub-copy group number, or pair group number. And the primary control device starts initial copying between the pair designated the primary logical disk and a secondary logical disk.

The group management program 1 monitors the pair state of the pair found in Step 12003 (Step 12005). In this monitoring processing, the group management program 1 sends a management command for inquiring about the pair state to a storage system via the management network 17, and receives a response to the management command from the storage system. Communication for inquiring about the pair state may be executed via other network, for example network for transmission IO request, and like.

When every pair that is a target of initial copying has shifted to the Duplex state (Step 12006), the group management program 1 sets the copy group and every sub-copy group that belongs to the copy group to the Duplex state. In other words, the group management program 1 updates the state fields of the copy group list and of the sub-copy group list (Step 12007).

In response to a request from the system management program 15 or the application program A 140, the group management program 1 notifies the issuer of the request of the state of a copy group or a sub-copy group. When notified, the system management program 15 or the application program A 140 outputs the state of the copy group or the sub-copy group. This way an administrator can keep track of the state of a copy group or a sub-copy group through the system management program 15 or the application program A 140 by having the group management program 1 record the state of the copy group or the sub-copy group in the copy group list or the sub-copy group list.

Through the above processing shown in FIG. 8, the group management program 1 can specify a particular copy group and have a storage system execute initial copying only for pairs that belong to the copy group specified. The group management program 1 is therefore capable of making copy groups that need initial copying alone to execute initial copying while restraining other pairs in the computer system from initial copying.

(3.2) Remote Copy Suspension Processing

Figure 9:
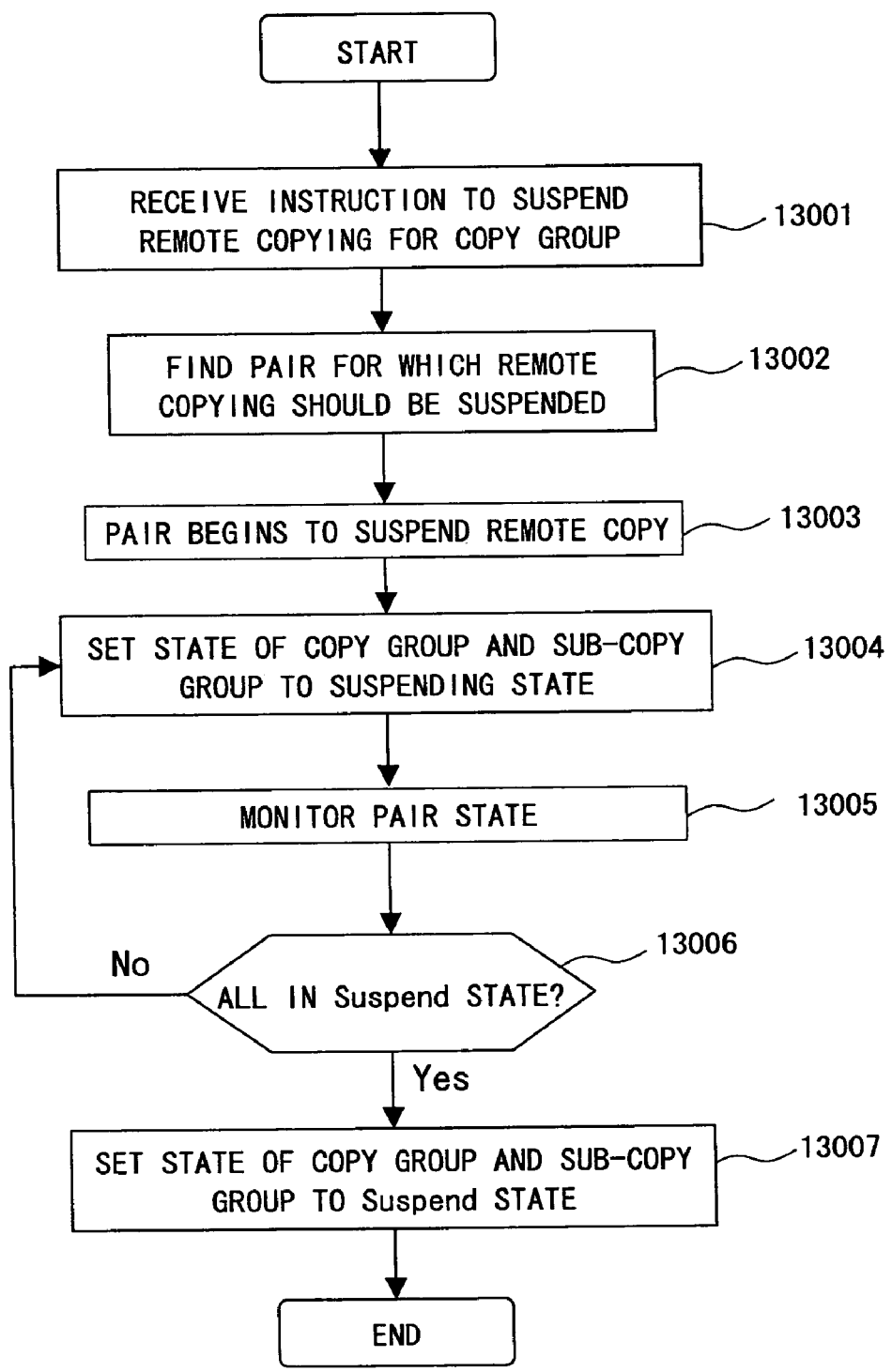
FIG. 9 is a diagram showing an example of processing for suspending remote copying on a copy group-to-copy group basis in the first embodiment.

FIG. 9 shows an example of processing for suspending remote copying on a copy group-to-copy group basis.

The group management program 1 receives a remote copy suspension instruction from the system management program 15 or the application program A 140. The remote copy suspension instruction contains a copy group number for specifying a copy group for which remote copying is to be suspended (Step 13001).

The group management program 1 refers to the copy group list 1402, the sub-copy group list 1450, and the pair information list 1440 to find pairs that belong to a copy group specified in the remote copy suspension instruction (Step 13002).

The group management program 1 instructs a primary control device that controls a primary logical disk of each pair found in Step 13002 to suspend remote copying for the pair. Receiving the remote copy suspension instruction, the primary control device suspends remote copying for the pair specified in the remote copy suspension instruction (Step 13003).

A remote copy suspension instruction issued from the group management program 1 to a primary control device contains the following information:

(A) Primary control device (copy source control device) ID (B) Primary logical disk number (C) Secondary control device (copy destination control device) ID (D) Secondary logical disk number Instead of the information listed above, the pair number of a pair for which remote copying is to be suspended may be contained in a remote copy suspension instruction. It is also possible for the group management program 1 to instruct a primary control device to suspend remote copying by specifying a combination of a copy group number and a sub-copy group number or by specifying a pair group number if a method similar to the one mentioned in the above description of Step 12004 is employed.

After instructing a primary control device to suspend remote copying, the group management program 1 sets the state of the copy group for which remote copying is to be suspended and the state of the sub-copy groups belonging to the copy group to the Suspending state (in other words, the state fields of the copy group list and of the sub-copy group list are updated) (Step 13004).

The group management program 1 monitors the pair state of each pair found in Step 13002. The monitoring method mentioned in the description of Step 12005 in FIG. 8 is employed (Step 13005).

When every pair belonging to the copy group that is a target of suspending of remote copying has shifted to the Suspend state (Step 13006), the state of the copy group and the sub-copy groups which has been updated in Step 13004 is set to the Suspend state (Step 13005).

Through the processing shown in FIG. 9, the group management program 1 can specify a particular copy group and have a storage system suspend remote copying for only pairs that belong to the copy group specified. The group management program 1 is therefore capable of suspending only copy groups for which remote copying should be suspended to suspend remote copying while allowing other pairs in the computer system to continue remote copying.

In some cases, however, the processing shown in FIG. 9 fails to maintain consistency between secondary logical disks belonging to a copy group for which remote copying is to be suspended. This is because timing at which primary control devices suspend remote copying for the pairs belonging to the copy group may vary from one pair to another.

For instance, consider a case where a pair A and a pair B are set in a copy group for synchronous remote copying, and an instruction to suspend remote copying for this copy group is received by the group management program 1. Remote copying for the pair A suspends first based on the remote copy suspension instruction, and the hosts 100 write data 1 in a primary logical disk A, which is one half of the pair A. Thereafter, the hosts 100 write data 2 in a primary logical disk B, which is one half of the pair B, and remote copying for the pair B suspends based on the remote copy suspension instruction.

In this case, the primary control device that controls the primary logical disk A sends a completion report to the hosts without sending the data 1 to a secondary logical disk A, which is the other half of the pair A, since remote copying has already been suspended for the pair A. Receiving the completion report, the hosts write the data 2 in the primary logical disk B. Since remote copying has not been suspended yet for the pair B, the primary control device that controls the primary logical disk B sends the data 2 to a secondary logical disk B, which is the other half of the pair B, before sending a completion report to the hosts. As a result, the data 2, which is written in the primary logical disk after the data 1 is stored in the secondary logical disk B whereas the data 1 is not stored in the secondary logical disk A, thus breaking the consistency between the secondary logical disk A and the secondary logical disk B.

(3.3) Remote Copy Suspension Processing Maintaining Consistency

Figure 10:
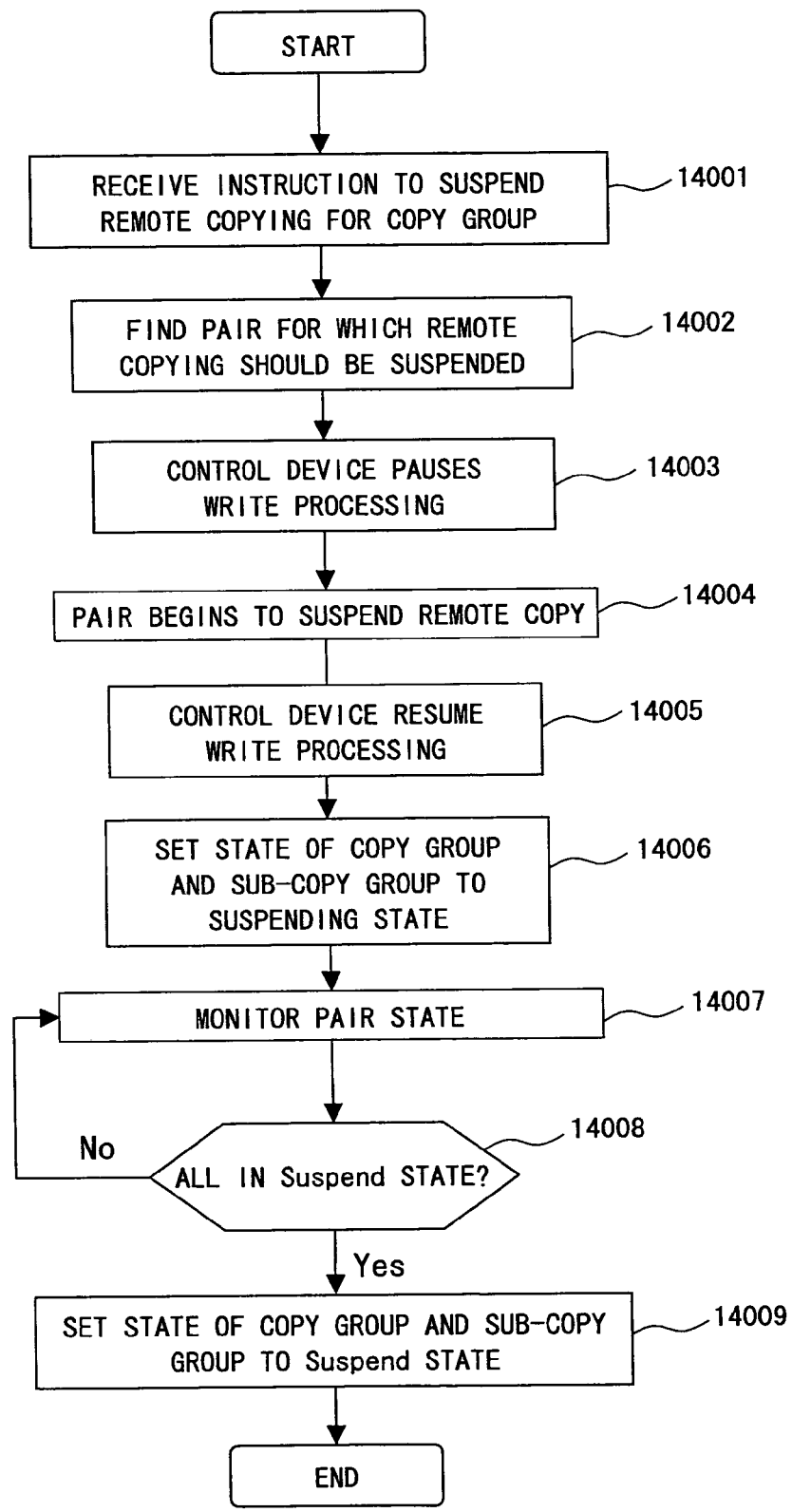
FIG. 10 is a diagram showing an example of processing for suspending remote copying on a copy group-to-copy group basis while maintaining the consistency between secondary logical disks in the first embodiment.

Now, see FIG. 10 which shows an example of how to suspend remote copy processing while maintaining consistency among all secondary logical disks in a copy group.

The group management program 1 receives a remote copy suspension instruction from the system management program 15 or the application program A 140. The remote copy suspension instruction contains a copy group number (Step 14001).

The group management program 1 refers to the copy group list 1420, the sub-copy group list 1450, and the pair information list 1440 to find pairs that belong to a copy group specified in the remote copy suspension instruction (Step 14002).

For each pair found in Step 14002, the group management program 1 instructs the primary control device that controls the primary logical disk constituting the pair to pause processing for a request made by the application program A 140 to write to the primary logical disk. Receiving the instruction, the primary control device carries out only a write request to the primary logical disk that is received by the primary control device prior to the pause instruction while putting on hold a write request to the primary control device that is received after the pause instruction (Step 14003). Thereafter, the primary control device sends a completion report to the group management program 1 in response to the pause instruction.

When every primary control device instructed in Step 14003 to pause a write request has followed the instruction and put the writing processing on hold (in other words, when the completion report is received from every relevant primary control device), the group management program 1 instructs, for each pair found in Step 14002, the primary control device that controls the primary logical disk constituting the pair to suspend remote copying. Receiving the remote copy suspension instruction, the primary control device starts remote copy suspension processing (Step 14004).

In the case where the type of remote copying between the relevant pair is synchronous remote copying, a write request, that is received prior to reception of the write request pause instruction by the primary control device in Step 14003, is executed by the primary control device and the write data based on the write request is sent to the secondary storage system. This is because, in synchronous remote copying, the primary control device sends the write data to the secondary storage system before sending a completion report to a host, which completes processing a write request. Therefore, the primary control device can immediately suspend the remote copy processing for the pair.

In the case where the type of remote copying between the relevant pair is asynchronous remote copying, on the other hand, the primary control device writes data in the primary storage system and sends a completion report to a host before writing the data in the secondary storage system. This causes write data (side file data) to remain in the primary control device without being sent to the secondary storage system despite the data being based on a write request that is received prior to the pause instruction by the primary control device in Step 14003. In such a case, the primary control device sends the side file data to the secondary control device and then suspends the remote copy processing. In asynchronous remote copying, writing may be resumed before sending the side file as long as every control device is working normally.

After instructing to suspend remote copy processing, the group management program 1 instructs the primary control device to resume the write request processing, which has been paused in Step 14003. Receiving the resumption instruction, the primary control device resumes the write request processing that has been paused in Step 14003 (Step 14005). It should be noted that the processing of writing in the primary logical disk alone is resumed and the remote copy processing suspended in Step 14004 remains suspended. Therefore, data, that is written in the primary logical disk as the write request processing is resumed, is not copied to the secondary logical disk.

The group management program 1 sets the state of the copy group specified in the remote copy suspension instruction that has been received in Step 14001 and the state of the sub-copy groups belonging to this copy group to the Suspending state (Step 14006). In short, the state fields of the copy group list 1420 and of the sub-copy group list 1450 are rewritten in this step.

A method similar to the one described in the description of Step 12005 in FIG. 8 is employed by the group management program 1 to monitor the pair state of the pairs found in Step 14002 (Step 14007).

When the pair state of every pair that belongs to the copy group specified in the remote copy suspension instruction has turned to the Suspend state (Step 14008), the state of the copy group and sub-copy groups updated in Step 14006 is set to the Suspend state (Step 14009).

The write request pause instruction (Step 14003), remote copy suspension instruction (Step 14004), and write request resumption instruction (Step 14005) issued from the group management program 1 to the primary control device contain the following information:

(A) Primary control device (copy source control device) ID (B) Primary logical disk number (C) Secondary control device (copy destination control device) ID (D) Secondary logical disk number Instead of the information listed above, the pair number of a pair that is the target of the instruction may be used. It is also possible for the group management program 1 to issue these instructions to a primary control device to suspend remote copying by specifying a combination of a copy group number and a sub-copy group number or by specifying a pair group number if a method similar to the one mentioned in the above description of Step 12004 in FIG. 8 is employed.

It is preferable to send some signal to a host from the primary control device while the write request processing is paused in Steps 14003 through 14005 in order to prevent the host from mistaking the suspension for shutdown of the function of the primary control device. An example can be found in a technique disclosed in U.S. Pat. No. 5,692,155B where the primary control device sends an Extended Long Busy status to the host, and this method can be employed in this embodiment.

Another method is conceivable if the host uses SCSI to issue to the primary control device an IO request (including a write request) regarding the primary logical disk. According to this method, the primary control device sets a Busy status or a Check Condition status to a status area contained in a response to the host that has issued the IO request and, upon receiving the response, the host reissues a write request. In this case, a SCSI device driver in an operating system executed in the host reissues of a write request. Therefore the write request reissued can be hidden from a file system of the host that is in an upper layer than the SCSI device driver or from an application program A 180 executed on the operating system of the host.

In the case where the host uses iSCSI to issue to the primary control device a write request to the primary logical device, there is no fear of the host mistaking when the primary control device does not respond to the host at all for about a minute since the host uses the retransmission of TCP to raise the reliability of an IP network, which is less reliable than Fibre Channel or FICON.

According to the processing shown in FIG. 10, processing of a write request to a primary logical disk is paused for every pair that belongs to the copy group and then remote copying is suspended for the pairs belonging to the copy group. Thus remote copying for the pairs belonging to the copy group can be suspended while maintaining the consistency among the secondary logical disks of the copy group.

For instance, consider a case where, similar to the above example, a pair A and a pair B are set in a copy group for synchronous remote copying and an instruction to suspend remote copying for this copy group is received by the group management program 1. According to FIG. 10, processing of writing in a primary logical disk A, which is one half of the pair A, and in a primary logical disk B, which is one half of the pair B, is paused first. Thereafter, remote copying for the pair A is suspended based on the remote copy suspension instruction. Then the hosts 100 write data 1 in the primary logical disk A constituting the pair A. Thereafter, the hosts 100 write data 2 to the primary logical disk B constituting the pair B, and remote copying for the pair B is suspended based on the remote copy suspension instruction (FIG. 10 is identical with FIG. 9 except for the suspension of the writing processing).

In this case, the primary control device that controls the primary logical disk A sends a completion report to the hosts without sending the data 1 to a secondary logical disk A, which is the other half of the pair A, since remote copying has already been suspended for the pair A. On the other hand, the data 2 is written before remote copying is suspended for the pair B whereas processing of a write request to the primary logical disk B constituting the pair B is paused. The primary control device that controls the primary logical disk B therefore does not write the data 2 in the primary logical disk B, nor does send the data 2 to a secondary logical disk B, which is the other half of the pair B.

As a result, neither the data 1 nor the data 2 are stored in the secondary logical disks. The only data stored in the secondary logical disks is one based on a write request that has been processed by the primary control devices before the instruction of pausing the write request processing is issued for the pairs belonging to the copy group. The stored data is written in the secondary logical disk following the synchronous remote copying method and keeping the order of writing in the primary logical disk. The processing of FIG. 10 is thus capable of suspending remote copying for pairs belonging to a copy group while maintaining consistency among plural secondary logical disks that belong to the copy group.

To maintain consistency between plural logical disks when remote copying processing is suspended for pairs belonging to a copy group in asynchronous remote copying, secondary control devices store data in secondary logical disks in the sequential order attached to write data, or a technique disclosed in U.S. Pat. No. 6,408,370 B is employed.

(3.4) Copy Restart

Processing of restart remote copying for a copy group after remote copying is suspended by the processing shown in FIG. 9 or FIG. 10 is basically the same as the remote copy starting processing shown in FIG. 8 except that the restart processing can omit Step 12000 since copy groups and sub-copy groups have already been created.

In the case where write data is written to a primary logical disk by a host while remote copying is suspended, the primary control device may record the position at which the write data is written with the use of bit map or the like. So, at least data whose position is recorded is copied from the primary control device to the secondary logical device in Step 12004.

(3.5) Suspension Remote Copy Processing due to a Failure

Figure 11:
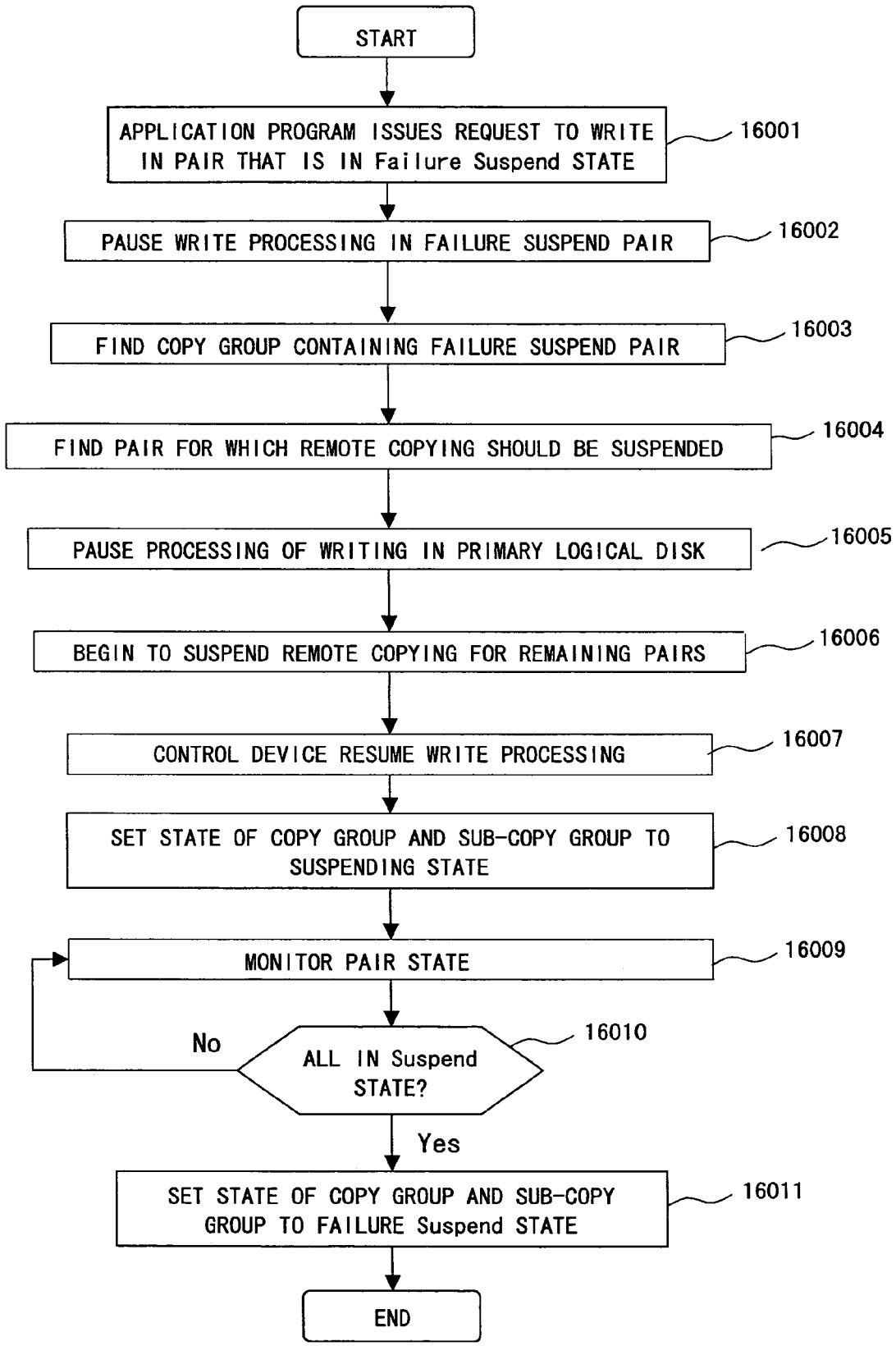
FIG. 11 is a diagram showing an example of processing that suspends, when one pair goes into a failure suspension state in the first embodiment, remote copying of pairs that belong to the same copy group as the pair that has failed while maintaining the consistency of secondary logical disks that belong to this copy group.

FIG. 11 shows a method of suspending copying for pairs in a copy group constituting a Failure Suspend state pair while maintaining the consistency among all secondary logical disks included in the copy group.

An application program in a host issues a write request to a primary logical disk of a pair that has gone into the Failure Suspend state (Step 16001).

A primary control device receives the write request and, when the write request is judged to be for the primary logical disk of the pair that is in the Failure Suspend state, puts processing of the write request on hold (Step 16002).

A primary control device cannot execute processing of writing data in a primary logical disk of a pair whose pair state is the Failure Suspend state because of a failure in the primary logical disk, or cannot send the data to a secondary control device because of a communication error, or an attempt to write data to a secondary storage system fails due to a failure in a secondary logical disk. This clues the primary control device in that the write request is for a primary logical disk of a pair that is in the Failure Suspend state. When a primary control device judges a write request as a request for a primary logical disk of a pair whose pair state is the Failure Suspend state, the primary control device notifies the host of putting processing of the write request on hold. The notification may be accompanied by information for identifying a secondary control device and a secondary logical disk associated with the pair.

The group management program 1 detects from the notification issued by the primary control device that the write request made by the application program is put on hold. Then the group management program 1 searches the pair information list for a copy group that has the primary logical disk for which the write request is put on hold and the secondary logical disk notified (Step 16003).

The group management program 1 looks up the copy group list 1420, the sub-copy group list 1450, and the pair information list 1440 for other pairs in the copy group that is found in Step 16003 (Step 16004).

For each pair obtained in Step 16004, the group management program 1 finds a primary control device that controls a primary logical disk of the pair and instructs the primary control device to pause processing of a request made by the application program A 140 to write to the primary logical disk (Step 16005).

Receiving the write request processing pause instruction, the primary control device processes a write request to the primary logical disk specified in the pause instruction if the write request is received prior to reception of the pause instruction, and puts on hold a write request that is received after the pause instruction. After putting write request processing on hold in accordance with the pause instruction, the primary control device sends a completion report to the group management program 1.

When the completion report is received from every primary control device that has been instructed in Step 16005 to pause the write request processing, the group management program 1 sends a remote copy suspension instruction to the primary control device that controls the primary logical disk of each pair found in Step 16004 (Step 16006). Receiving the instruction, the primary control device suspends the remote copying processing for the specified in the instruction. The primary control device executes the remote copy suspension processing of Step 14004 shown in FIG. 10.

After the remote copy processing is suspended in Step 16006, the group management program 1 instructs the primary control device to resume processing of the write request which has been put on hold in Step 16004 (Step 16007). Receiving the resumption instruction, the primary control device resumes the write request processing. As in Step 14005 of FIG. 10, the processing resumed at this point is processing of writing data in the primary logical disk and the remote copy processing remains suspended. Accordingly, data written in the primary logical disk as processing of a write request is resumed is not copied to the secondary logical disk.

The group management program 1 sets the state of the copy group found in Step 16003 and the state of sub-copy groups that belong to this copy group to the Suspending state (Step 16008). Steps 16007 and 16008 may be executed in the reverse order.

The group management program 1 then monitors the pair state of the pairs found in Step 16004 (Step 16009). The monitoring method described with reference to FIG. 8 is employed. When every pair that is a monitor target turns into the Suspend state (Step 16010), the state of the copy group and of sub-copy groups which has been updated in Step 16008 is set to the Failure Suspend state (Step 16011).

The method of suspending remote copy processing upon occurrence of a failure which is shown in FIG. 11 is effective in the case where the remote copy type is synchronous remote copying for pairs constituting a copy group. This is because, as in FIG. 10, remote copy processing is suspended after processing of a write request is suspended for a pair in a copy group that has gone into the Failure Suspended state and for the remaining pairs in this copy group as well. It is therefore possible to suspend remote copy processing for pairs in a copy group excluding a pair that is in the Failure Suspend state while maintaining the consistency among all secondary logical disks that belong to the copy group.

On the other hand, when the remote copy type is asynchronous remote copying, the consistency has to be ensured upon occurrence of a failure by using, for example, the method disclosed in U.S. Pat. No. 6,408,370 B.

Similar to the remote copy suspension processing described with reference to FIG. 10, it is desirable to send some signal from the primary control device to the host while processing of a write request to the primary logical disk is paused in Steps 16005 through 16007, in order to prevent the host from mistaking the suspension for shutdown of the function of the primary control device. The method described above referring to FIG. 10 can be employed for that purpose.

The following methods are conceivable as a way for the group management program 1 to know that processing of a write request in Step 16003 is being put on hold in the primary control device:

(A) When an Extended Long Busy status is received from the primary control device, an operating system of the host outputs reception of the Extended Long Busy status to a console. The output to the console is monitored by the group management program 1 to detect that processing of a write request is put on hold.

(B) When the host receives a response containing a Busy status or a Check Condition status in a SCSI status byte from the primary control device, an operating system of the host outputs the reception to a console or to a log file. The group management program 1 detects that processing of a write request is put on hold by monitoring the console or the log file.

The write request pause instruction (Step 16005), remote copy suspension instruction (Step 16006), and write request resumption instruction (Step 16007) issued from the group management program 1 to the primary control device contain the pair number of a pair that is the subject of the instruction.

It is also possible for the group management program 1 to issue those instructions to a primary control device by specifying a combination of a copy group number and a sub-copy group number or by specifying a pair group number if a method similar to the one mentioned in the above description of Step 12004 is employed.

A disk driver run on the operating system of the host may execute the tasks of the group management program 1 from monitoring of pause of the write request processing to pause the write request processing in Steps 16003 through 16005. Futhormore, one of the primary control devices may execute all or part of the tasks described in FIG. 11. In this case, it is more effective that Steps 16003 through 16008 are executed the primary control devices that have a Failure Suspend pair.

<Second Embodiment>

A second embodiment will be described.

Figure 12:
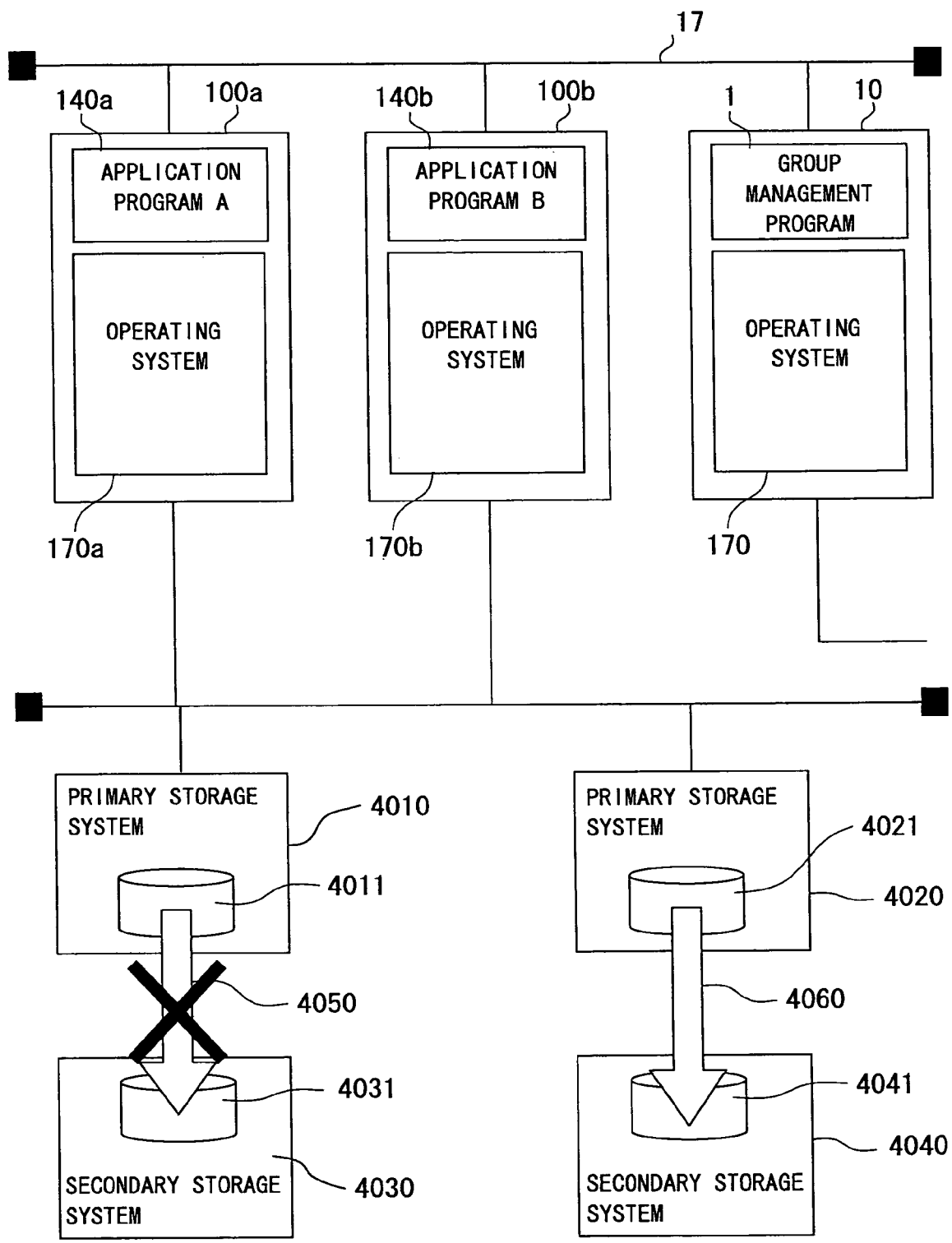
FIG. 12 is a diagram showing an example of a computer system according to a second embodiment.

FIG. 12 is a block diagram showing a structural example of a computer system according to the second embodiment.

The computer system has hosts (100*a* and 100*b*), an management computer 10, and storage systems (4010, 4020, 4030 and 4040). The storage systems have control devices and logical disks (4011, 4021, 4031 and 4041, respectively) as in the first embodiment.

The host 100*a*, the host 100*b*, and the management computer 10 are connected to one another via a network 17. The host 100*a*, the host 100*b*, the management computer 10, and primary storage systems (4010 and 4020) are connected to one another via a network.

The primary storage system 4010 and a secondary storage system 4030 are connected to each other whereas the primary storage system 4020 and a secondary storage system 4040 are connected to each other. The storage systems execute remote copying.

The host 100*a* has an operating system 170*a* and an application program A 140*a* stored in a memory to be executed by a CPU. The application program A reads and writes data in the logical disk 4011 following a protocol which is not SCSI.

The host 100*b* has an operating system 170*b* and application program B 140*b* stored in a memory to be executed by a CPU. The application program B reads and writes data in the logical disk 4021 following the SCSI protocol.

The application program A and the application program B cooperate in performing one processing while communicating with each other. Therefore, when certain processing of the application program B is to be executed after certain processing of the application program A is completed, the application program A transfers a "processing completed" message to the application program B via the network 17 and the application program B starts the processing after the completion message is received from the application program A for synchronization.

The logical disk 4011 and the logical disk 4031 form a pair (4050) for remote copying. The logical disk 4021 and the logical disk 4041 form another pair (4060) for remote copying.

The management computer 10 has group management program 1 stored in a memory to be executed by a CPU. The group management program 1 manages the pair 4050 and the pair 4060 together as a copy group. The group management program 1 may instead be contained in the host 100*a* or the host 100*b*.

The configuration of the hosts, the management computer, and the storage systems is identical with the one in the first embodiment, and therefore is omitted from FIG. 12.

The second embodiment is capable of maintaining the consistency between the pair 4060 in which the shot 100*b* writes data using the SCSI protocol and the pair 4050 in which the host 100*a* writes data using a protocol other than SCSI, in case of a failure. A procedure for when a failure occurs in the pair 4050 or the pair 4060 will be described below.

Figure 13:
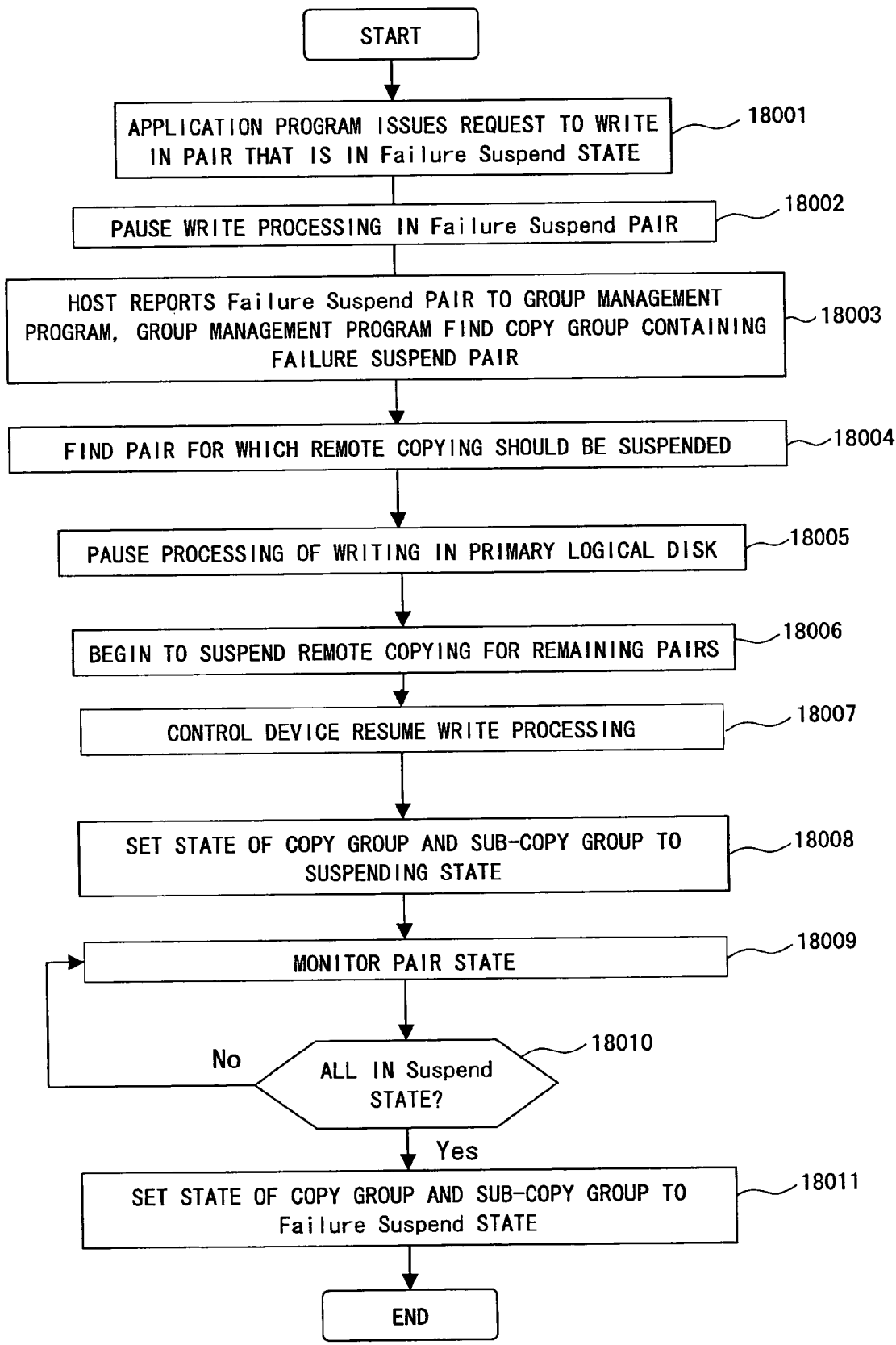
FIG. 13 is a diagram showing an example of processing for when a failure occurs in one pair in the second embodiment.

FIG. 13 is a diagram showing an example of processing for when a failure occurs in the pair 4050 in the system of FIG. 12.

The application program 140*a* of the host 100*a* issues a write request in the primary logical disk 4011 of the primary storage system 4010 following a protocol other than SCSI (Step 18001).

The primary control device of the primary storage system 4010 detects that the target pair of the write request received is in the Failure Suspend state, and sends an Extended Long Busy status to the host 100*a* to pause processing of writing the primary logical disk 4011 (Step 18002). The Failure Suspend detection method described above with reference to FIG. 11 is employed.

The operating system 170*a* of the host 100*a* notifies the group management program 1 of the reception of the Extended Long Busy status via the network. The notification contains the following information of the pair that has gone into the Failure Suspend state:

(A) Primary control device (copy source control device) ID (B) Primary logical disk number (C) Secondary control device (copy destination control device) ID (D) Secondary logical disk number The pair number may be contained instead of the information listed above. Using the received information, the group management program 1 refers to a pair information list to find a copy group to which the pair that is in the Failure Suspend state belongs (Step 18003).

The group management program 1 then looks up a copy group list, a sub-copy group list, and the pair information list for other pairs in the copy group that is found in Step 18003 (Step 18004).

For each pair obtained in Step 18004, the group management program 1 specifies a primary control device that controls a primary logical disk of the pair and instructs the primary control device to pause processing of a write request to the primary logical disk. Receiving the instruction, the primary control device processes a write request to the primary logical disk if the write request is received prior to reception of the write request pause instruction, and puts on hold a write request to the primary logical disk that is received after the pause instruction (Step 18005). In the case where a write request is received after the pause instruction, the associated primary control device performs the following processing:

(A) The primary control device sends an Extended Long Busy status in response to the write request when the request is made in accordance with a protocol other than SCSI.

(B) The primary control device sends a Busy status or a Check Condition status in response to the write request when the request is made in accordance with the SCSI protocol.

In other words, the primary control device sends an Extended Long Busy status when a primary logical disk is accessed by the host 100*a* after the pause instruction, and sends a Busy status or a Check Condition status when the primary logical disk is accessed by the host 100*b* after the pause instruction.

The primary control device stores what protocol is used by the hosts to access primary logical disks in order to choose from the above (A) and (B) properly for the respective primary logical disks.

As the writing processing is paused, the primary control device sends a completion report to the group management program 1.

When the completion report is received from every primary control device that has been instructed in Step 18005 to pause the write request processing, the group management program 1 instructs the primary control device that controls the primary logical disk of each pair found in Step 18004 to suspend remote copying for the pair. Receiving the remote copy suspension instruction, the primary control device suspends remote copy processing for the pair specified in the instruction (Step 18006).

After instructing to suspend remote copying, the group management program 1 instructs the primary control device to resume processing of the write request to the primary logical disk which has been put on hold in Step 18005. Receiving the resumption instruction, the primary control device resumes the write request processing (Step 18007).

The group management program 1 sets the state of the copy group found in Step 18003 and the state of sub-copy groups that belong to this copy group to the Suspending state (Step 18008).

The group management program 1 then monitors the pair state of the pairs found in Step 18003 (Step 18009). When every one of the pairs turns into the Suspend state (Step 18010), the state updated in Step 18008 is set to the Suspend state (Step 18011).

FIG. 13 illustrates the processing taking as an example the case where a failure occurs in the pair 4050, which is to be accessed through a protocol other than the SCSI protocol. A similar method can guarantee the consistency when a failure occurs in the pair 4060, which is to be accessed through the SCSI protocol. In this case, the primary control device of the primary storage system 4020 detects that the target pair of the write request received is in the Failure Suspend state, and sends a Busy status or a Check Condition status to the host 100*b* to pause processing of writing the primary logical disk 4021.

The write request pause instruction (Step 18005), remote copy suspension instruction (Step 18006), and write request resumption instruction (Step 18007) issued from the group management program 1 to the primary control device contain the following information:

(A) Primary control device (copy source control device) ID (B) Primary logical disk number (C) Secondary control device (copy destination control device) ID (D) Secondary logical disk number The pair number may be contained instead of the information listed above. It is also possible for the group management program 1 to issue those instructions to a primary control device by designating a combination of a copy group number and a sub-copy group number or by designating a pair group number if the method explained in the description of Step 12004 of FIG. 8 is employed. Futhormore, one of the primary control devices may execute all or part of the tasks described in FIG. 13. In this case, it is more effective that Steps 18003 through 18007 are executed the primary control devices that have a Failure Suspend pair.

As has been described, a control device of a storage system can notify a failure in an appropriate manner to a host when a failure occurs in a remote copy pair by having the control device manage whether the SCSI protocol or other protocol is used by the host to access a logical disk controlled by the control device. This makes it possible to suspend remote copying while ensuring, upon occurrence of a failure, the consistency between pair constituted of logical disks that are accessed through the SCSI protocol and pairs constituted of logical disks accessed by a protocol other than the SCSI protocol.

<Third Embodiment>

A third embodiment will be described next.

Figure 14:
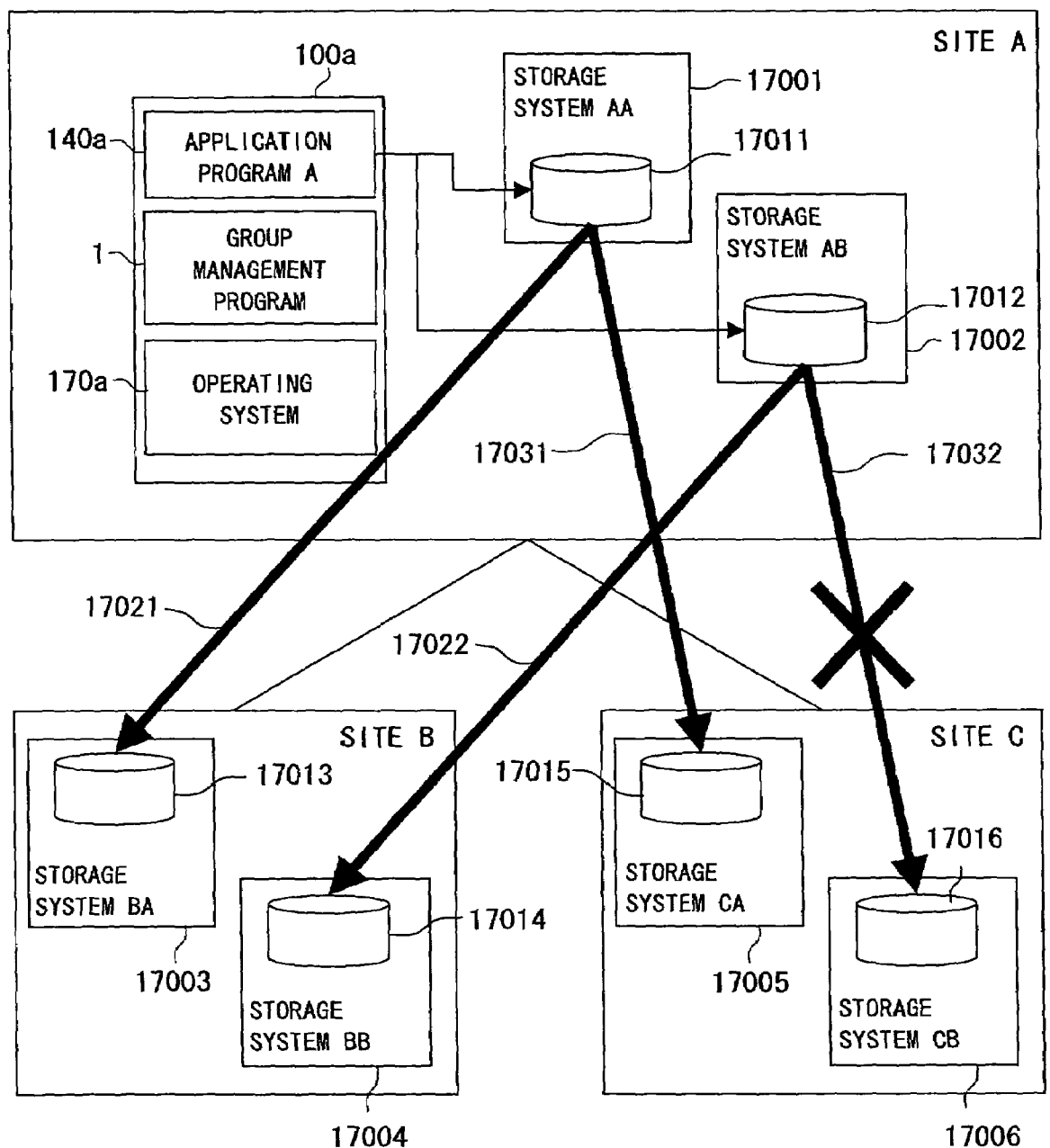
FIG. 14 is a diagram showing a structural example of a 3-site computer system according to a third embodiment.

FIG. 14 is a block diagram showing a structural example of a 3-site computer system according to the third embodiment. The 3-site computer system is composed of three sites: a site A, a site B, and a site C.

The site A includes a host 100a, a storage system AA 17001, and a storage system AB 17002. The storage system AA has a primary control device and a primary logical disk 17011. The storage system AB has a primary control device and a primary logical disk 17012. The host 100a has an application program A 140a, group management program 1, and an operating system 170a. The application program A reads and writes data in primary logical disks (17011 and 17012).

The site B includes a storage system BA 17003 and a storage system BB 17004. The storage system BA has a secondary control device and a secondary logical disk 17013. The storage system BB has a secondary control device and a secondary logical disk 17014.

The site C includes a storage system CA 17005 and a storage system CB 17006. The storage system CA has a secondary control device and a secondary logical disk 17015. The storage system BB has a secondary control device and a secondary logical disk 17016.

The primary logical disk 17011 and the secondary logical disk 17013 form a pair (17021) for remote copying. The primary logical disk 17012 and the secondary logical disk 17014 form a pair (17022) for remote copying. The primary logical disk 17011 is also paired with the secondary logical disk 17015 (a pair 17031). Similarly, the primary logical disk 17012 is also paired with the secondary logical disk 17016 (a pair 17032). The copy type for the pair 17021 and the pair 17022 is asynchronous remote copying. The copy type for the pair 17031 and the pair 17032 is synchronous remote copying. Therefore data is remotely copied from the site A to the site B and to the site C in parallel in this embodiment.

The configuration of the host, an management computer, and the storage systems is identical with the one in the first embodiment, and therefore is omitted from FIG. 14.

The group management program 1 sets copy groups, sub-copy groups, and pairs placing the pairs 17021 and 17022 in a copy group 1 and the pairs 17031 and 17032 in a copy group 2.

FIG. 15 shows an example of a copy group list, sub-copy group list, and pair information list set to the host 100a. The copy group list, sub-copy group list, and pair information list shown in FIG. 15 are created by following the processing illustrated in FIG. 6 and FIG. 7.

The copy group 1 and the copy group 2 are registered in the copy group list, and a pointer to a sub-copy group list is registered for each copy group.

Since there are two copy groups here, two sub-copy group lists are prepared for each of the copy groups. In each sub-copy group list, pairs belonging to the same copy group are grouped by a primary control device to be registered as a sub-copy group. The copy group 1 in the system shown in FIG. 14 includes a sub-copy group 1 to which the pair 17021, whose copy source control device is the primary control device of the storage system AA, belongs and a sub-copy group 2 to which the pair 17022, whose copy source control device is the primary control device of the storage system AB, belongs. The copy type is asynchronous remote copying for both of the two sub-copy groups. The copy group 2 includes a sub-copy group 1 to which the pair 17031, whose copy source control device is the primary control device of the storage system AA, belongs and a sub-copy group 2 to which the pair 17032, whose copy source control device is the primary control device of the storage system AB, belongs. The copy type is synchronous remote copying for both of the two sub-copy groups.

There are four pairs present in the system shown in FIG. 14 and therefore a pair information list has the four pairs (17021, 17022, 17031 and 17032) registered.

In this setting, assume a case where a failure occurs in the pair 17032 turning the pair status into the Failure Suspend state. The processing shown in FIG. 11 is executed to suspend remote copy processing for the pairs 17031 and 17032 which belong to the copy group 1. On the other hand, remote copy processing is not suspended for the pairs 17021 and 17022 which belong to the copy group 2, not the copy group 1 to which the pair 17032 in the Failure Suspend state belongs. Remote copying from the site A to the site B is therefore continued.

As has been described, this embodiment allows the group management program to suspend remote copy processing on a copy group-to-copy group basis while maintaining the consistency. It is thus possible, when a failure occurs between the site A and the site C suspending remote copying, to continue remote copy processing between the site A and the site B while maintaining the consistency between the secondary logical disks of the site C if pairs are managed such that a pair for remote copying between the site A and the site B and a pair for remote copying between the site A and site C belong to different copy groups.

While the present invention has been described in detail and pictorially in the accompanying drawings, the present invention is not limited to such detail but covers various obvious modifications and equivalent arrangements, which fall within the purview of the appended claims.

What is claimed is:

1. A remote copy system comprising:
 a copy group manager;
 a plurality of first storage systems including a plurality of first logical disks and first controllers;
 a plurality of second storage systems, coupled to the plurality of first storage systems, including a plurality of second logical disks and second controllers; and
 a plurality of third storage systems, coupled to the plurality of first storage systems, including a plurality of third logical disks and third controllers;
 wherein a plurality of synchronous type remote copy pairs are configured between the plurality of first logical disks and the plurality of second logical disks, to transmit data, received from a host computer for the plurality of first logical disks, from the plurality of first storage systems to the plurality of second storage systems by a synchronous remote copy procedure, and to write the data in the plurality of the second logical disks while keeping consistency of data in the plurality of second logical disks;

wherein a plurality of asynchronous type remote copy pairs are configured between the plurality of first logical disks and the plurality of third logical disks, to transmit data, received from a host computer for the plurality of first logical disks, from the plurality of first storage systems to the plurality of third storage systems by an asynchronous remote copy procedure, and to write the data in the plurality of the third logical disks while keeping consistency of data in the plurality of third logical disks;

wherein the copy group manager is configured to manage a synchronous copy group including the plurality of synchronous type remote copy pairs, and an asynchronous copy group including the plurality of asynchronous type remote copy pairs, to receive a report related to a failure of a remote copy process regarding one of the first logical disks from the plurality of first storage systems, to obtain information to specify one of the copy groups including one of the remote copy pairs related to the failure, and to decide whether the copy group, including the one of the remote copy pairs related to the failure, is the synchronous copy group or the asynchronous copy group, in order to suspend remote copy processes for the plurality of remote copy pairs included in the decided copy group, wherein, in the plurality of first logical disks, one of the first logical disks in which data sent in accordance with an SCSI protocol is written, and another of the first logical disks in which data sent in accordance with a protocol other than the SCSI protocol is written, are included.

2. A remote copy system according to claim 1, wherein the report related to the failure of the remote copy process has information to specify the remote copy pair related to the failure, and the copy group including the remote copy pair related to the failure is specified based on the information included in the report.

3. A remote copy system according to claim 1, further comprising a step of:
if the remote copy pair related to the failure is included in the synchronous copy group, controlling to suspend remote copy processes for the plurality of synchronous type remote copy pairs, while keeping remote copy processes for the plurality of asynchronous type remote copy pairs.

4. A remote copy system according to claim 3, wherein the copy group manager is configured to suspend the remote copy processes by:
instructing the first controllers to pause write processes to the plurality of first logical disks, receiving completion reports of pausing the write processes from the first controllers, receiving the completion reports, instructing the first controllers to suspend remote copy processes for the plurality of synchronous remote copy pairs; and instructing the first controllers to restart the write processes to the plurality of first logical disks after the remote copy processes for the plurality of synchronous remote copy pairs are suspended.

5. A remote copy system according to claim 4, wherein, when each first controller receives an instruction to pause the write processes to the plurality of first logical disks, the first controller is configured to execute a write process according to a write request received before the instruction, and to suspend a write process according to a write request received after the instruction.

6. A remote copy system according to claim 4, wherein the copy group manager is further configured to select the synchronous type copy group, to select the plurality of synchronous type remote copy pairs included in the synchronous copy group, and to instruct the first controllers to start the remote copy processes for the plurality of synchronous remote copy pairs.

7. A remote copy system according to claim 1,
wherein procedures to suspend remote copy processes are different between the plurality of synchronous type remote copy pairs and the plurality of asynchronous type remote copy pairs.

8. A remote copy method in a system, wherein:
the system comprises:
a plurality of first storage systems, including a plurality of first logical disks and first controllers;
a plurality of second storage systems, coupled to the plurality of first storage systems, including a plurality of second logical disks and second controllers; and
a plurality of third storage systems, coupled to the plurality of first storage systems, including a plurality of third logical disks and third controllers, the remote copy method comprising steps of:
configuring a plurality of synchronous type remote copy pairs, each including one of the plurality of first logical disks and one of the plurality of second logical disks, to transmit data, received by one of the plurality of first storage systems, including the one of the plurality of first logical disks, from a host computer, to one of the plurality of second storage systems by a synchronous remote copy procedure, and writing the data in the one of the plurality of second logical disks while keeping consistency of data in the plurality of second logical disks;
configuring a plurality of asynchronous type remote copy pairs, each including one of the plurality of first logical disks and one of the plurality of third logical disks, to transmit data, received by one of the plurality of first storage systems, including the one of the plurality of first logical disks, from a host computer, to one of the plurality of third storage systems by an asynchronous remote copy procedure, and writing the data in the one of the plurality of third logical disks while keeping consistency of data in the plurality of third logical disks;
creating a synchronous copy group, including the plurality of synchronous type remote copy pairs, and an asynchronous copy group, including the plurality of asynchronous type remote copy pairs;
sending data, received from a host computer, from one of the plurality of first storage systems to one of the plurality of second storage systems according to the plurality of synchronous type remote copy pairs and to one of the plurality of third storage systems according to the plurality of asynchronous type remote copy pairs;
storing the data received from the one of the plurality of first storage systems in one of the plurality of second logical disks according to the plurality of synchronous remote copy pairs;

storing the data received from one of the plurality of first storage systems in one of the plurality of third logical disks according to the plurality of asynchronous remote copy pairs;

receiving a report related to a failure of a remote copy process regarding one of the plurality of first logical disks;

obtaining information to specify one of the copy groups including the remote copy pair related to the failure; and deciding whether the synchronous copy group or the asynchronous copy group includes the remote copy pair related to the failure, in order to suspend remote copy processes for the plurality of remote copy pairs included in the decided copy group while keeping consistency of data of a plurality of logical disks included in the plurality of remote copy pairs.

wherein, in the plurality of first logical disks, one of the first logical disks in which data sent in accordance with an SCSI protocol is written, and another one of the first logical disks in which data sent in accordance with a protocol other than the SCSI protocol is written, are included.

9. A remote copy method according to claim 8, wherein the report related to the failure of the remote copy process has information to specify the remote copy pair related to the failure, and the copy group including the remote copy pair related to the failure is specified based on the information included in the report.

10. A remote copy method according to claim 8, further comprising a step of:

if the remote copy pair related to the failure is included in the synchronous copy group, controlling to suspend remote copy processes for the plurality of synchronous type remote copy pairs, while continuing remote copy processes for the plurality of asynchronous type remote copy pairs.

11. A remote copy method according to claim 10, wherein the step of controlling to suspend the remote copy processes comprising steps of:

instructing the first controllers to pause write processes to the plurality of first logical disks;

receiving completion reports of pausing the write processes from the first controllers;

after receiving the completion reports, instructing the first controllers to suspend remote copy processes for the plurality of synchronous remote copy pairs; and instructing the first controllers to restart the write processes to the plurality of first logical disks after the remote copy processes for the plurality of synchronous remote copy pairs are suspended.

12. A remote copy method according to claim 11, wherein, when each first controller receives an instruction to pause the write processes to the plurality of first logical disks, the first controller executes a write process according to a write request received before the instruction, and suspends a write process according to a write request received after the instruction.

13. A remote copy method according to claim 11, further comprising steps of:

selecting the synchronous type copy group;

selecting the plurality of synchronous type remote copy pairs included in the synchronous copy group; and instructing the first controllers to start the remote copy processes for the plurality of synchronous remote copy pairs.

14. A remote copy method according to claim 8, wherein procedures to suspend remote copy processes are different between the plurality of synchronous type remote copy pairs and the plurality of asynchronous type remote copy pairs.

* * * * *